United States Patent
Ball et al.

(10) Patent No.: US 6,701,294 B1
(45) Date of Patent: Mar. 2, 2004

(54) USER INTERFACE FOR TRANSLATING NATURAL LANGUAGE INQUIRIES INTO DATABASE QUERIES AND DATA PRESENTATIONS

(75) Inventors: Thomas J. Ball, Mercer Island, WA (US); Kenneth Charles Cox, Naperville, IL (US); Rebecca Elizabeth Grinter, Naperville, IL (US); Stacie Lynn Hibino, Naperville, IL (US); Lalita Jategaonkar Jagadeesan, Naperville, IL (US); David Alejandro Mantilla, New York, NY (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/487,684

(22) Filed: Jan. 19, 2000

(51) Int. Cl.[7] .......................... G06F 17/28; G10L 15/18
(52) U.S. Cl. .......................... 704/257; 704/9; 704/270
(58) Field of Search .......................... 704/257, 9, 270; 707/4, 5

(56) References Cited

U.S. PATENT DOCUMENTS

| | | | | |
|---|---|---|---|---|
| 5,500,920 A | * | 3/1996 | Kupiec | 704/270.1 |
| 5,515,488 A | * | 5/1996 | Hoppe et al. | 345/440 |
| 5,619,709 A | * | 4/1997 | Caid et al. | 715/532 |
| 6,178,404 B1 | * | 1/2001 | Hambleton et al. | 704/275 |
| 6,298,174 B1 | * | 10/2001 | Lantrip et al. | 382/305 |

OTHER PUBLICATIONS

James F. Knutson etal., "Evolution of a User Interface Design: NCR's Management Discovery Tool (MDT)™",In CHI'97 Conference Proceedings, NY: ACM Press, 1997, pp. 526–533.

* cited by examiner

Primary Examiner—Richemond Dorvil
Assistant Examiner—Donald L. Storm

(57) ABSTRACT

A natural language-based interface data presentation system interfaces, for example, information visualization system interfaces, is realized by employing so-called open-ended natural language inquiries to the interface that translates them into database queries and a set of information to be provided to a user. More specifically, a natural language inquiry is translated to database queries by determining if any complete database queries can be formulated based on the natural language inquiry and, if so, specifying which complete database queries are to be made. In accordance with one aspect of the invention, knowledge of the information visualization presentation is advantageously employed in the interface to guide a user in response to the user's natural language inquiries. In accordance with another aspect of the invention, knowledge of the database and knowledge of the information visualization presentation are advantageously employed in the interface to guide a user in response to the user's natural language inquiries. In accordance with still another aspect of the invention, knowledge of the database, knowledge of the information visualization presentation and context information about the query dialogue are advantageously employed in the interface to guide a user in response to the user's natural language inquiries. In one or more first prescribed embodiments of the invention, the set of data presentation information can be in audio, visual, or both audio-visual form. In one or more other prescribed embodiments of the invention, the inquiry and data presentation information delivery process can be interactive between the user and the interface. In one or more still other prescribed embodiments of the invention, one or more modes of user-interface interaction can be utilized. These modes of interaction can include text, speech, point and click, or the like.

16 Claims, 17 Drawing Sheets

100

USER INTERFACE FOR TRANSLATING NATURAL LANGUAGE INQUIRIES INTO DATABASE QUERIES AND DATA PRESENTATIONS

TECHNICAL FIELD

This invention relates to user interfaces and, more particularly, to an interface for a data presentation system.

1. Background of the Invention

Current interfaces for data presentation systems and, specifically, for information visualization systems, typically only support so-called traditional input devices such as a mouse and/or keyboard. Recent developments in speech recognition have made it possible to provide other modes of interaction with information visualization systems. To this end, it would be relatively simple to provide a speech-based interface that has a one-to-one correspondence to a mouse interface. However, it has been shown that speech is not effective when used as a direct one-to-one replacement for either a mouse or a keyboard.

2. Summary of the Invention

Problems and limitations of prior known data presentation system interfaces, for example, information visualization system interfaces, are overcome by employing so-called open-ended natural language inquiries to the interface that translates them into database queries and a set of information to be provided to a user. More specifically, a natural language inquiry is translated to database queries by determining if any complete database queries can be formulated based on the natural language inquiry and, if so, specifying which complete database queries are to be made.

In accordance with one aspect of the invention, knowledge of the information visualization presentation is advantageously employed in the interface to guide a user in response to the user's natural language inquiries.

In accordance with another aspect of the invention, knowledge of the data under exploration and knowledge of the information visualization presentation are advantageously employed in the interface to guide a user in response to the user's natural language inquiries.

In accordance with still another aspect of the invention, knowledge of the data under exploration, knowledge of the information visualization presentation and context information about the query dialogue are advantageously employed in the interface to guide a user in response to the user's natural language inquiries.

In one or more first prescribed embodiments of the invention, the set of data presentation information can be in audio, visual, or both audio-visual form.

In one or more other prescribed embodiments of the invention, the inquiry and data presentation information delivery process can be interactive between the user and the interface.

In one or more still other prescribed embodiments of the invention, one or more modes of user-interface interaction can be utilized. These modes of interaction can include text, speech, point and click, or the like.

A technical advantage of the invention is that a user is allowed to focus on answering questions supported by the interface, rather than on the specific mechanics of accessing data and creating presentations of the information.

DETAILED DESCRIPTION

Figure 1:
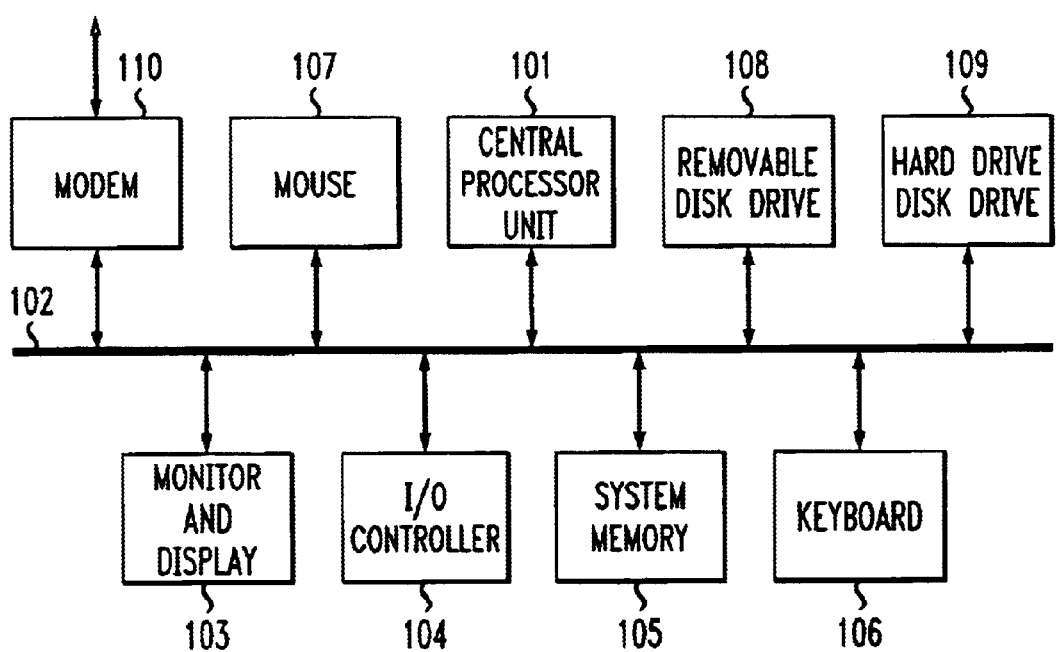
FIG. 1 shows, in simplified block diagram form, details of a personal computer or workstation on which the invention may be practiced.

FIG. 1 shows, in simplified block diagram form, details of apparatus including an embodiment of the invention. Thus, shown is computer system 100 including central processor unit 101 interconnected via bus 102 with monitor and display 103, I/O controller 104, system memory 105, keyboard 106, mouse 107, removable disk drive 108, hard disk drive 109 and modem 110. Indeed, FIG. 1 illustrates but one arrangement that may be utilized in implementing an embodiment of the invention, and other similar arrangements, personal computers, workstations or the like, may be employed to equally practice one or more embodiments of the invention. Note that one or more databases, files, target application programs, etc. may be stored in system memory 105.

It is noted that although the embodiments of the invention are described herein as they relate to information visualization system interfaces, they are generally, equally applicable to data presentation system interfaces.

Figure 2:
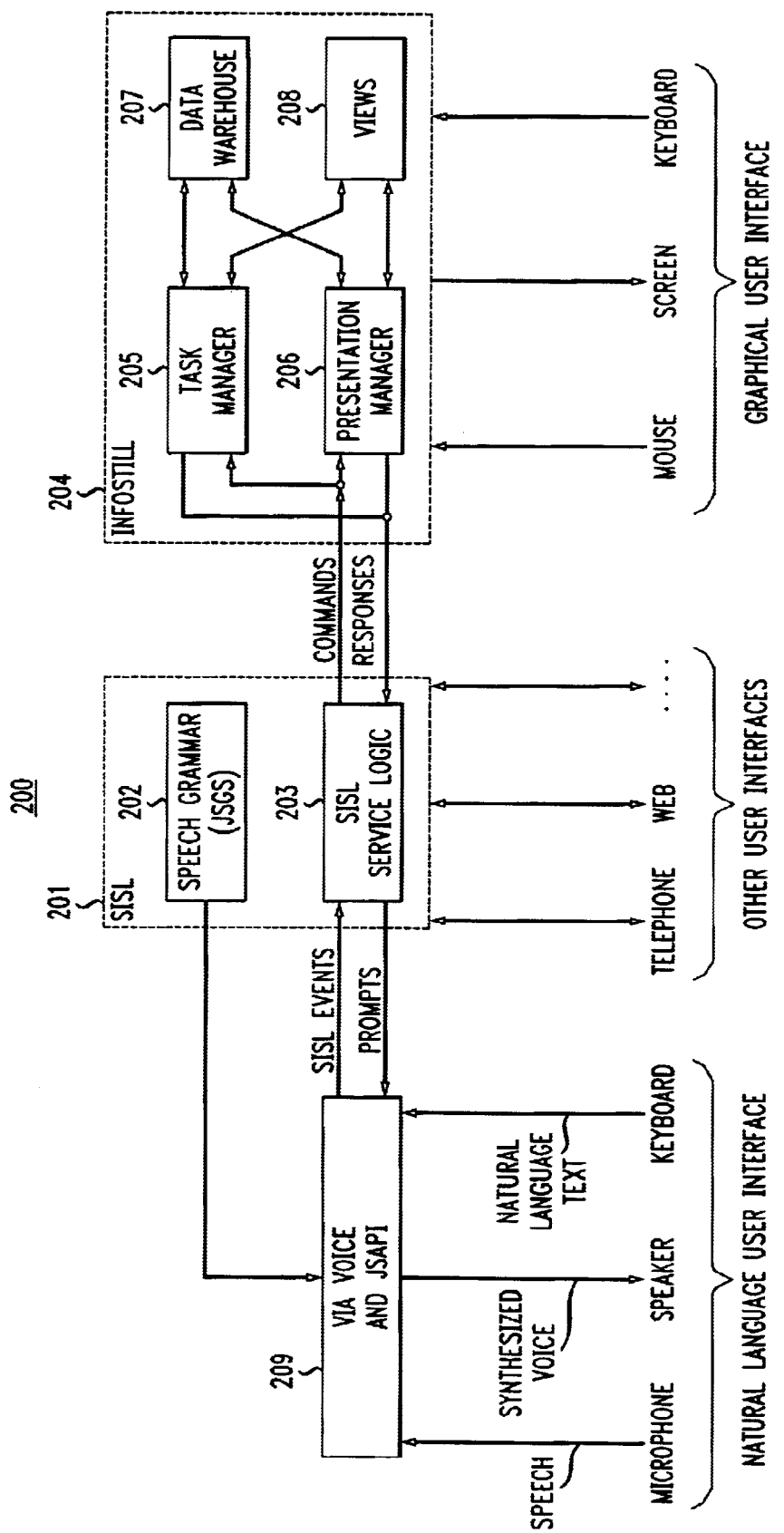
FIG. 2 shows, in simplified block diagram form, details of a system architecture on which an embodiment of the invention may be practiced.

FIG. 2 shows, in simplified block diagram form, details of a system architecture 200 on which an embodiment of the invention may be practiced. Shown are SISL 201 including SISL grammar unit 202 and SISL service logic 203, InfoStill 204 including Task Manager 205, Presentation Manager 206, Data Warehouse 207 and Views 208, and viaVoice and JSAPI 209.

The natural language interfaces that may be employed in practicing the invention in architecture, i.e., system, 200 are separated into at least the following complementary components.

One interface component is a Data-independent natural language support for users to manipulate information visualization views. This interface allows users to control and select info V is views via natural language, where the voice commands are essentially at the same level as traditional mouse and keyboard commands. For example, the user might say "sort by largest column," and may then interact with the updated view through a combination of natural language and mouse commands. This natural language interface is independent of the semantics of the data to be explored, and can be used across all data sets. However, it assumes that the user has some familiarity with the structure of the data and some experience with info V is environments.

Another interface component is a domain knowledge and interactive design to guide users in exploring a specific data set. This natural language interface is aimed at providing higher-level support for information visualization, tailored for a specific data set. In particular, it uses knowledge about the syntax and semantics of the data, as well as knowledge about info V is views, to guide the user in exploring a specific data set. The aim is to allow users who are unfamiliar with the structure of the data and/or with info V is tools to explore the data set naturally and effectively.

In particular, our approach has the following steps:

Select a data set for which to build a natural language interface.

Identify key threads of inquiry for this data set.

For each thread of inquiry, identify the class of database queries and info V is views that would be helpful in providing relevant answers about the data.

Build a dialogue system that interacts with the user to determine which threads of inquiry are of interest to the user. Using knowledge about the syntax and semantics of the data, this dialogue system should provide guidance to the user in exploring the data along these lines of inquiry and determine which database queries would aid the user in understanding the data. Using knowledge about info V is frameworks, the system should then automatically create the appropriate information visualization views via an info V is framework. The user thus does not need to be familiar with the structure of the data or have previous experience with info V is frameworks.

The system 200 thus guides the user in exploring the data by using domain-specific knowledge, and automatically creates a set of info V is views that aid in data analysis. The user may then interact with the generated views via a combination of natural language using both interfaces, and the traditional mouse and keyboard interface. This interface thus complements the data-independent natural language interface described earlier.

This unique approach to implementing such multi-modal interfaces to an info V is framework is to integrate SISL (Several Interfaces, Single Logic) 201, an approach for creating interactive services with multiple interfaces, with InfoStill 204, an existing info V is environment. We use SISL 201 to create a single service logic that is shared by several interfaces. These interfaces include natural language via automatic speech recognition on a desktop microphone or over the telephone, or text input through a graphical user interface or via the web. SISL grammars from 202 specify the user utterances that are recognized by the system. Dialogue management is specified by the SISL service logic 203, which also constructs the appropriate database query and chooses the appropriate view to display. It then sends the corresponding command to InfoStill 204, which displays and updates the relevant views.

InfoStill 204 is a task-oriented framework for analyzing data through information visualization. It supports data analysis tasks such as getting an overview of data tables from a data warehouse 207, interactively exploring data in search of trends within a linked views paradigm, and creating hierarchical, annotated presentations of results in the form of live documents (i.e., standard HTML web pages enhanced with linked Java applet visualizations). More importantly, InfoStill 204 supports users in mapping threads of inquiry to relevant interactive presentations of results.

Using this technology, we have implemented a data independent natural language interface of the kind described above, and have implemented a natural language interface tailored for employee databases. Importantly, both of these interfaces can be used in conjunction with the traditional point-and-click interface to InfoStill 204. This system is written in Java. ViaVoice 209, which is commercially available from International Business Machines (IBM), and its associated Java Speech API (JSAPI) library are used to perform automatic speech recognition, and run it on a standard Windows-based PC.

The overall system architecture 200 is shown in FIG. 2. In this architecture, the SISL service logic 203 uses a natural-language user interface implemented with IBM's ViaVoice 209 and interpreted with input from the speech grammar 202 to send commands to the InfoStill 204 info V is framework. Commands sent to the InfoStill Presentation Manager (PM) 206 are used to control and select visualization views, while commands sent to the InfoStill Task Manager (TM) 205 select data subsets and create views to present to the end-user. Note that a natural language user interface is realized using ViaVoice 209 through speech via a microphone, synthesized voice to a speaker, natural language text via a keyboard or the like. Similarly, other user interfaces, e.g., telephone, Web or the like, are realized through SISL 201. A graphical user interface is realized through InfoStill 204 using a mouse, monitor screen, keyboard or the like. More detailed information about SISL 201, InfoStill 204, and the connection between these two key components of our system architecture is described below.

It is becoming more and more commonplace for modern interactive services, such as those for personal banking or stock trading, to have more than one interface for accessing the same data. For example, many banks allow customers to access personal banking services from an automated teller machine, bank-by-phone interface, or web-based interface. Some telephone-based services even support automatic speech recognition and natural language understanding.

When multiple interfaces are provided to the same service, duplication can be a serious problem in that there may be a different service logic (i.e., the code that defines the essence of the service) for every different user interface to the service. Furthermore, to support natural language interfaces, services must allow users considerable flexibility in the way they input their service requests. Some of the desired capabilities include allowing requests to be phrased in various ways (e.g., needed information can appear in any order), prompting for missing information, correction of erroneous information, lookahead (to allow the user to speak several commands at once), and backtracking to earlier points in the service logic. Current approaches for multi-modal services are based on finite-state machines. The machines are often duplicated (in part or whole) for each different interface, and often every possible ordering of request must be described explicitly. The resulting finite state machines are huge and impossible to maintain.

SISL 201 is an architecture and domain-specific language for structuring services with multiple user interfaces. SISL 201 supports multiple user interfaces, allows flexibility in inputs, and enables service providers to support multiple interchangeable interfaces to a single consistent source of service logic and data.

FIG. 2 shows how SISL 201 is used in this invention and also serves to illustrate the use of SISL 201 for supporting multiple interfaces. The SISL service logic 203 communicates with multiple user interfaces. The interfaces include a speech engine using IBM's ViaVoice 209 and its associated Java Speech application programming interface (API) library, and a graphical user interface using InfoStill 204. As indicated, SISL 201 can communicate with other interfaces, such as telephones, Web servers or browsers, e-mail, and so on. The SISL service logic 203 and the multiple user interfaces communicate via events. The SISL service logic 203 communicates to user interfaces which information it is ready to accept next. Based on this information, the user interfaces prompt the user to provide the appropriate information and respond if the user requests help. The user interfaces then collect the information from the user and send it to the service logic. Any user interface that performs these functions can be used in conjunction with a SISL service logic 203. For example, SISL 201 may inform the natural-language interface that it can accept an organization e.g., if the user has said "Show me the size of the organization." The interface may then prompt the user, e.g. by speaking "What organization do you want to see?" If the user responds with something that the natural-language interface recognizes as an organization, the interface will then generate a SISL event indicating the organization was detected. This event will then be processed by the SISL service logic 203. SISL 201 also provides a convenient framework for designing and implementing a variety of interfaces. The user interface (UI) designer need only specify a prompt and a help function that generate strings to be given as prompts to the user. For natural language interfaces, a set of speech grammars (the input to a speech recognition engine that permits it to efficiently and effectively recognize spoken input) is also required. From these functions and grammars, the SISL 201 infrastructure automatically generates user interfaces, and integrates them with the SISL service logic 203. For automatic speech recognition based interfaces, the SISL 203 infrastructure automatically generates a desktop interface based on the Java Speech API (JSAPI).

Further details of SISL 201 are described below.

InfoStill 204, short for Information Distillery, is a framework for information visualization (info V is) that aids users in the various tasks associated with performing data analyses. In practice, data analysis with an info V is environment involves a number of user tasks, such as developing a problem definition, identifying and retrieving appropriate data sources, exploring and analyzing the data, and recording the results of the analysis for presentation. This process is far from linear and typically involves many separate threads of investigation, some of which may be discarded as dead ends, together with considerable backtracking.

As indicated above, the major system components of the InfoStill 204 architecture are the Task Manager 205 and Presentation Manager 206; these obtain data from the Data Warehouse 207 and present it in the form of (dynamically-created) Views 208. InfoStill 204 uses a linked views paradigm, whereby users may interact with the displayed data (e.g., by selecting some of the graphics) and see the results of their actions propagated to other views.

The Task Manager 205 assists users in organizing their analysis process, breaking down their analysis into groups and sequences of tasks. For example, a user wishing to answer a question such as "How are the jobs in a given organization distributed among the departments within that organization?" must perform a series of tasks. First the analyst must obtain the data for the organization, departments, and jobs from the data warehouse. This task involves sub-tasks such as finding the appropriate data table, selecting fields from that table, and formulating a query to retrieve the desired data. The data must then be displayed as one or more views, an activity that itself has sub-tasks such as choosing data, choosing the type of view (bar charts, line charts, tables, etc.), and creating the view. Expertise about successful patterns of investigation may be stored in the form of task templates which users can use as starting points in their analysis process.

The Presentation Manager 206 displays the results of an analysis in the form of presentations, i.e., Views 208. The Presentation Manager 206 combines two paradigms. First, it is a workspace where users can interactively analyze data using linked views. Second, it is a reporting system, which allows the results of analyses to be saved for later examination. For example, the Task Manager may be asked to list the tables in the data warehouse or the fields within those tables, or to create a new database query. Similarly, the Presentation Manager 206 may be asked to create a new view using the results of a database query. This capability was originally used for scripting and bookmarks, but as the next section illustrates it has proved to be very useful when integrating SISL 201 with InfoStill 204.

SISL 201 is connected to InfoStill204 via the InfoStill 204 command API, thereby keeping a simple interface between the two systems. This means that InfoStill 2–4 is not a SISL 201 user interface, so InfoStill 204 does not generate SISL 201 events, nor does it respond to SISL 201 prompts for input. The commands sent by SISL service logic 203 to InfoStill 204 are passed to the Task Manager 205 and Presentation Manager 206, and executed. Results from queries, i.e., responses, are returned through the same API. The SISL natural-language interface logic is thus using InfoStill 204 to generate and display views of data in much the same way that a SISL banking logic would access and use the bank's accounting system to inspect and modify account balances. By restricting the interaction between SISL 201 and InfoStill 204 to the InfoStill API, we have the flexibility to run InfoStill 204 with multi-modal interfaces supported by SISL 201 or in a stand-alone mode without SISL 201. This also means that when InfoStill 204 is run with SISL 201, users can interact with InfoStill 204 through both the graphical users interface (GUI) included with InfoStill 204 and the alternative interaction modes provided by SISL 201. For example, the user might produce and display a group of views and perform a selection with the mouse. The user might then ask, using the voice interface, "How many people are currently selected?" In order to answer this question, SISL 201 must use the InfoStill 204 API to query the views (through the Presentation Manager 206) for the result, which is then given to the user (e.g., by generating speech on the voice interface).

A goal of system 200 is to provide data-independent natural language support for controlling and selecting Views 208 that have already been created through InfoStill 204. This natural language interface is intended to be independent of the semantics of the data to be explored, and thus must be usable across all InfoStill data sets. To implement this interface, we needed to write a SISL grammar 202 and SISL service logic 203 for generating Presentation Manager (PM) 206 events to send to InfoStill 204. As described above and depicted in FIG. 2, the automatic speech recognition engine used with SISL 201 matches user utterances against the SISL grammars from 202 and generates SISL events that are sent to the SISL service logic 203. In response to these events, the SISL service logic 203 performs actions such as prompting users for additional information, or sending PM 206 commands to InfoStill 204.

PM 206 commands are well-defined events for accomplishing the following types of user interactions: setting the current view, selecting data items or subsets within a view, identifying data items or objects within a view, hiding or showing data items or subsets in a view, and sorting data items or objects within a sortable view (e.g., sorting bars in a bar chart-alphabetically or by size). PM 206 commands focus on the interface to InfoStill 204 views 208 and are independent of the domain of the data being displayed within Views 208. Thus, the same SISL grammar 202 and SISL service logic 203 can be used to generate PM 206 commands for InfoStill Views 208 of any data set, independent of the domain of the data. Since PM 206 commands are well defined, the core SISL grammars from 202 and SISL service logic 203 for generating them are fairly straightforward and can be easily written based on the existing mouse and menu GUI to the InfoStill Views 208. In order to leverage natural language features such as dialogue and context, however, we identified:

1. common natural language alternatives for talking about views and interacting with them; and
2. distinctions between the types of commands that are easy to speak but potentially difficult to specify with the GUI, and vice versa. In particular, we identified ways in which the GUI and natural language interfaces could be used to complement one another.

Consider the case of selecting bars in a bar chart. In the GUI interface, users can select bars with the mouse by clicking on individual bars or lassoing a group of bars. In addition, they can access other common selection actions such as "select all", "unselect all" or "toggle all" directly from a popup menu. For the simple and short selection actions, the SISL grammar 202 can parse the spoken equivalents to the menu commands, as well as variations to the commands (e.g., to toggle the selection of bars in a bar chart, a user can say "toggle all", "toggle all bars" or "toggle selection"). Speaking the selection of individual or groups of bars (i.e., selections essentially equivalent to those made with a mouse), however, introduces some interesting variations and subtleties. For example, selections such as "select the top ten bars" or "select all bars greater than 20" can be easy to say, but may be more cumbersome to specify with the mouse, especially for a larger number of similarly sized bars.

A combination of common natural language and info V is terminology is added to the SISL grammar 202 and the SISL service logic 203 for this interface. These extensions allow users more flexibility in natural language input to InfoStill 204. In particular, if a user specifies only partial information or inconsistent information, our interface will prompt the user and collect the remaining information. For example, if a user merely says "sort", the interface will prompt the user as to the desired sorting criteria. Our interface also encapsulates a sequence of InfoStill 204 GUI commands into a single spoken command, such as "sort by first and third smallest columns". The SISL service logic 203 then sends the appropriate sequence of PM 206 commands to InfoStill 204.

Excerpts from the SISL grammars from 202 and SISL service logic 203 used for doing sorting on a bar chart are as follows:

```
<sort>= "sort" [<order>] [by] [the]
            ( ("current selection"
                | "highlighted bars")
              {sort-byselected}
                |<sort-bysize>
                |<sort-byorder>
                |<sort-bynewselect>
            ) {sort} [<order>];
<sort_bynewselect>=
            (<select_bypos>
                |<select_bysize>
                |...
            ) {selectreplace} {sort_byselected};
<select_bypos>=(<intval>(select_bypos)
                            <add_to_selection>;
<add_to_selection>=
            ([and] [the]<intval> {select_bypos})*
            <bar> {selectdone};
<help> = ("help" | "I need help") {help}
```

The "|" notation indicates choices among the subrules, while the [ ] notation indicates that the subrule inside the brackets is optional. The subrules inside <> specify that another subrule with the enclosed name is to be invoked. Here, <intval> refers to a subrule that matches against "first", "third", etc, and <bar> matches against different spoken alternatives for the phrase "bar" or "bars". The * indicates that the enclosed expression may be matched multiple times. The expressions inside { } correspond to the SISL 201 (FIG. 2) events automatically sent to the SISL service logic 203.

Figure 3:
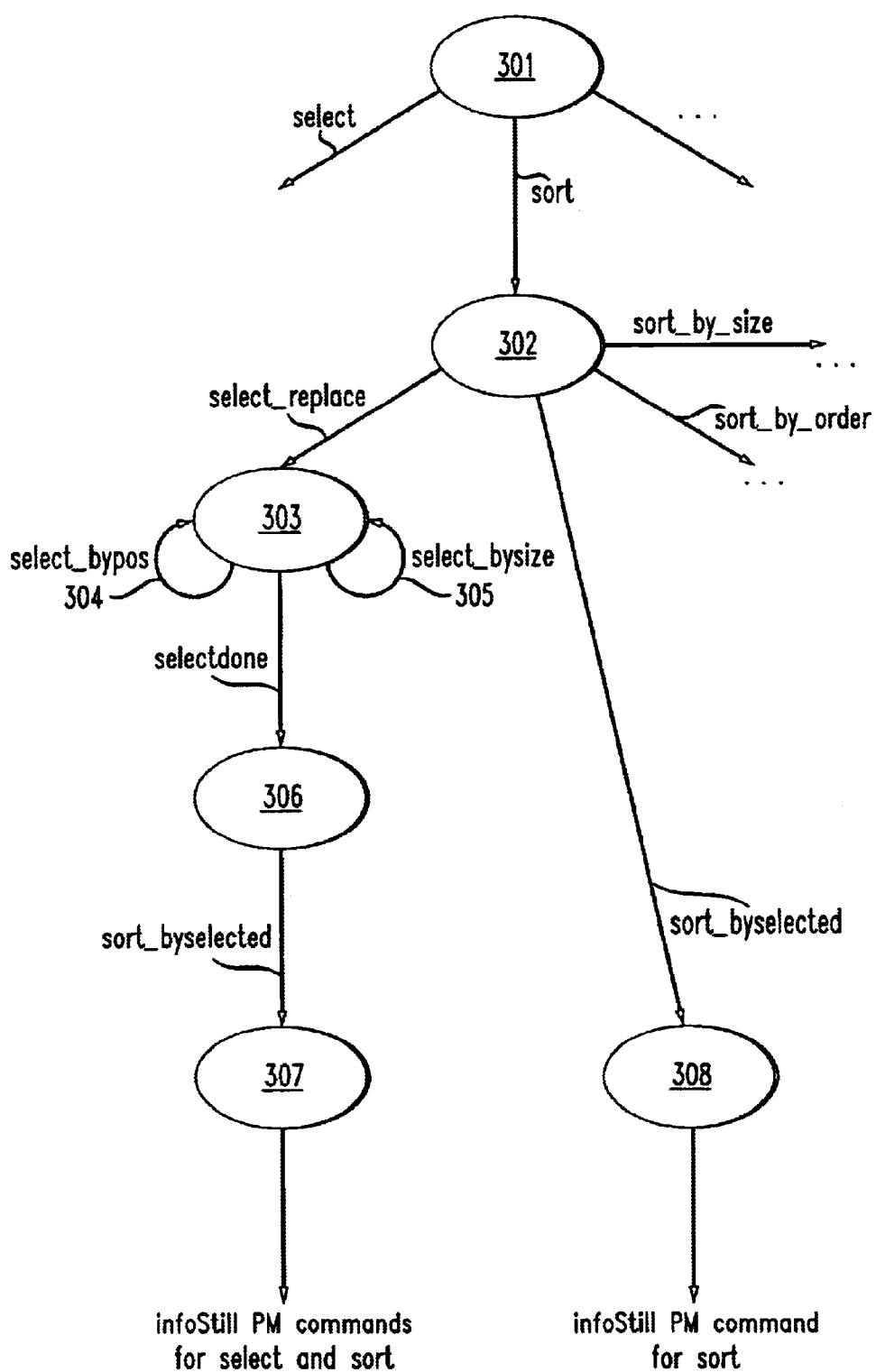
FIG. 3 is a reactive constraint graph illustrating the SISL service logic 203 of FIG. 2 for a portion of a data-independent interface.

FIG. 3 is a reactive constraint graph illustrating the SISL service logic 203 of FIG. 2 for a portion of a domain-independent interface. Initially, the SISL service logic 203 is in an idle node 301. In idle node 301, the SISL service logic 203 can accept a sort or select event, for example. If a sort event arrives from the speech recognition engine, the SISL service logic 203 changes state to the target of the arrow labeled sort, namely, node 302. If it next receives a select_replace event, it changes once again to node 303. It loops in this new node 303 upon receipt of either select_bypos 304 or select_bysize 305 events. It exits node 303 upon receipt of a selectdone event and goes to node 306. Upon receiving a sort_byselected event, it goes to node 307, which is a "leaf" node. When traversal reaches a leaf node, e.g., node 307, the appropriate PM 206 command is sent to InfoStill 204. Note that a leaf node 308 is reached directly from node 302 upon receiving a sort_byselected event. The end user can thus say "Sort by current selection". This matches the <Sort> grammar rule, and causes the SISL sort and sort_byselected events to be sent to the SISL service logic 203. The SISL service logic 203 then sends a PM 206 command to InfoStill 204, corresponding to sorting by the currently selected data. Alternatively, the user might say, "Sort by first and third column." The "first and third column" matches against the <select_bypos> subrule, since the "and third column" matches the <add_to_selection> subrule. Hence, the sort, select_replace, select_bypos(first), select_by_pos(third), select_done, and sort_by_selected events are sent to the service logic. The SISL service logic 203 then sends two PM 206 commands to InfoStill 204: one corresponding to sorting by the first column; and another corresponding to sorting by the third column. The SISL service logic 203 also remembers the context of the user dialogue. For example, if the user now says "And the fifth column", the SISL service logic 203 remembers that a new selection had just been made for the basis of a sort. SISL service logic 203 thus sends PM 206 commands to InfoStill 204 corresponding to adding the fifth column to the current selection and sorting by it.

If the user is unsure about the sorting criteria, he/she may just say "Sort". This matches the <sort> grammar rule, and causes a sort event to be sent to the SISL service logic 203. Since no other events have been sent, the SISL service logic 203 then prompts the user with "Do you want to sort by current selection, by size, by order, or by a new selection?" The user can then say the appropriate choice. If the user is completely unsure of what to say, he/she can simply say "I need help". The service logic will receive a help event, and will prompt the user with "You may sort or select the data, or . . ."

This sample SISL grammar 202 and SISL service logic 203 illustrate the power of using SISL 201 for processing speech commands to InfoStill Views 208. In particular, our interface increases the precision in data selection for large data sets, allows the user to speak a single sentence corresponding to a sequence of InfoStill GUI commands, and allows the user to give partial information, giving guidance as to the possible user options corresponding to that task. This natural language interface can be used across all data sets.

Domain knowledge and interactive design is employed in an interface to guide users in exploring a specific data set. This natural language interface is aimed at providing higher-level support for information visualization, tailored for a specific data set. It is thus closely related to the InfoStill Task Manager 205 (TM), which is designed to help users manage their data analysis tasks. An important aspect of this task to aid users in matching their intended analysis inquiries with a single View 208 or set of Views (together with the appropriate data variables to display) that aid in investigating these inquiries. A collection of such inquiries and corresponding info V is views are typically tailored to a particular data domain. Saving such a collection into a "task template" provides old and new InfoStill 204 users with a starting place for examining newer versions of the same data or similar data from the same domain. This is particularly useful for native or novice info V is users, who may know the types of analysis inquiries in which they are interested (e.g. "how has an organization evolved over time?") but may not have knowledge about data set details nor knowledge about which views to use for exploring data.

The speech interface for generating TM 205 commands uses the notion of a task template in that:

1. guides an end user to focus on and articulate an analysis inquiry of interest; and
2. uses the system (in this case, the SISL service logic) to present the data and set of InfoStill Views 208 relevant to the user's inquiry.

In particular, the SISL grammar 202 and SISL service logic 203 leverage the dialogue and context features of natural language to dynamically generate the set of InfoStill Views 208 appropriate for the user's inquiry. The SISL service logic 203 manages a dialogue with the user to refine a vaguely worded analysis inquiry into a well-defined natural language query. The SISL service logic 203 then translates this query into InfoStill TM 205 commands. Unlike PM 206 commands that are well defined and data domain independent, TM 205 commands are more loosely defined and strongly dependent on the domain of the data; for example, inquiring about grocery store data when analyzing medical data would not be useful.

Thus, analysis inquiries of interest about an organizational database are:

"Where did people in [organization x] come from?"
"How many new hires were there in (organization x] during 1999?"
"Show me the new hires for [organization x]."
"What do people in [organization x] do?"
"Show me the contractors in [organization y]."
"Where do people in [organization y) live?"
"How has [organization z] grown over time?"
"How many people were in [organization z) in July 1999?"

For each thread of inquiry, the class of database queries and InfoStill Views 208 were identified that would be helpful in providing relevant answers about the organizational data. A SISL grammar 202 and SISL service logic 203 were generated to collect information from the user, conduct a dialogue with the user about his/her intended inquiries (from the identified set), refine these inquiries into complete and unambiguous queries, and generate corresponding TM 205 commands to send to InfoStill 204. The user can then interact with the generated views through a combination of the speech commands from the domain-independent natural language interface, and the InfoStill 204 GUI interface. For example, consider the inquiry "where did people in [organization x] come from?" The underlying query is ambiguous, since it might refer to either the organizations from which people came, or the geographic locations from which they came. The interface will thus prompt the user with "Do you mean organizations or locations?" When sufficient information has been gathered from the user to construct a complete and unambiguous query, the SISL service logic 203 generates an appropriate TM 205 command: for example, it may create a bar chart, values list and/or grid chart, displaying the appropriate data variables.

Excerpts from the SISL grammars from 202 and SISL service logic 203 used for conducting a dialogue about inquiries regarding "where did people in organization X come from?" and "how has organization X evolved over time?" are as follows:

```
public <peopleXfrom> =
    ("where"
        | ("what organization" {organizations})
        | ("what location" {locations})
    )
    "did people" {who} [in <org> {which}]
    "come from {peoplefrom};
public <orgorloc> =
    ("show" ["me"] "organizations" {organizations})
    |("show" ["me"] "locations" {locations}));
public <whatorglevel> =
    "at the"
    ("department" | "lab" | "division")
    {whatorglevel} 'level";
public <when> =
    ("since" | ('as of'))
    (<month> | ("now" | "today")) {when};
public <orggrowth> =
    "how has' <org> {which }
    "grown over time" {orggrowth};
```

Figure 4:
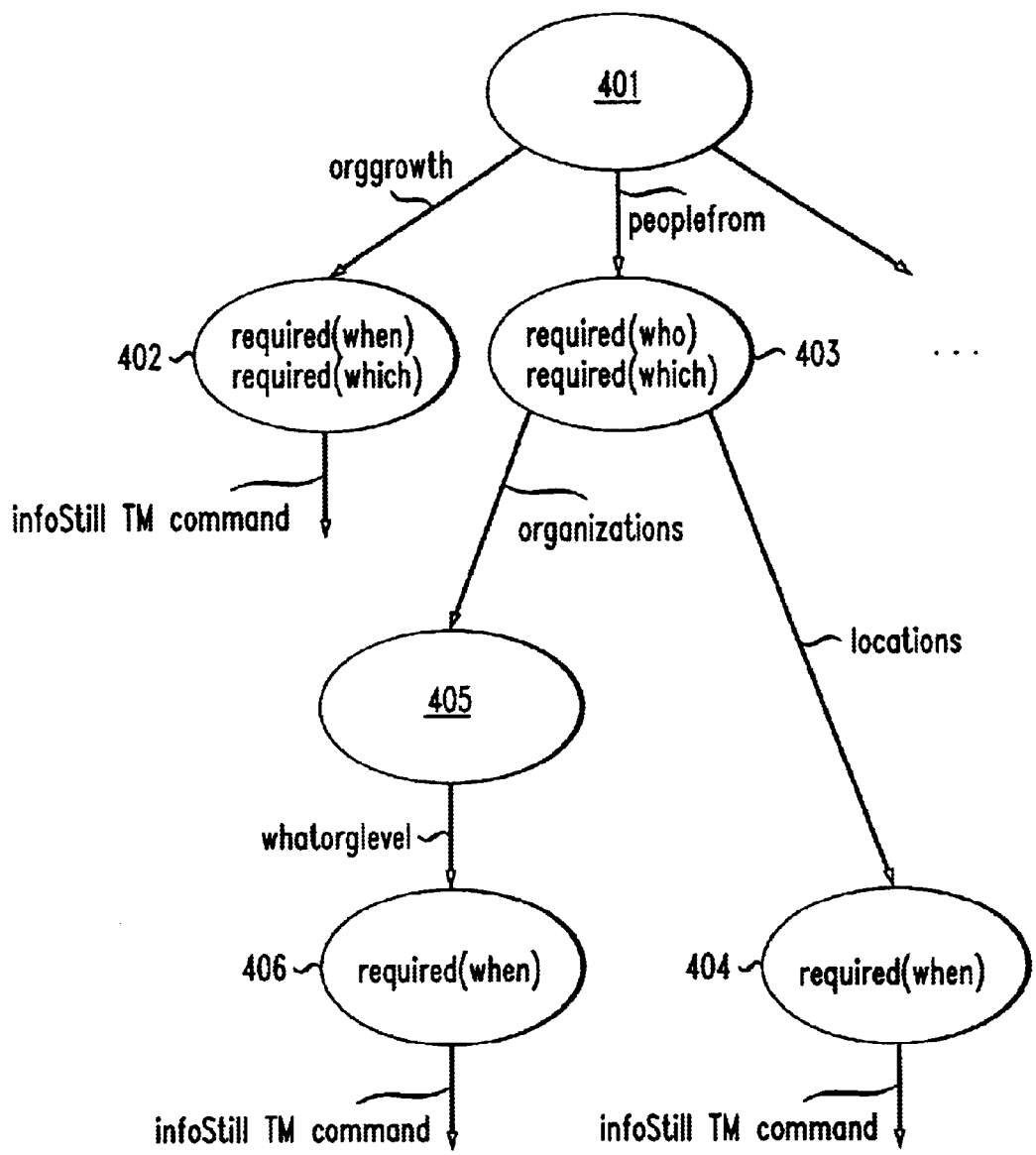
FIG. 4 is a reactive constraint graph illustrating the SISL service logic 203 of FIG. 2 for a portion of a natural language interface to organizational data.

FIG. 4 is a reactive constraint graph illustrating the SISL service logic 203 of FIG. 2 for a portion of a natural language interface to organizational data. In its initial node 401 the corresponding SISL service logic 203 can accept events corresponding to the types of inquiries. If it receives a peoplefrom event from the speech recognition engine, it changes to the target node, namely, node 403. It then requires a who event and which event, in either order before it can change to another node. When both events have been received, it needs either an organizations or locations event to change node. If an organizations event is received it goes to node 405. Then, upon receiving a whatorglevel event, it goes to node 406, which requires a when event. When the SISL service logic 203 is in node 403 and a locations event is received, it changes to node 404, which also requires a when event. When traversal reaches a leaf node, i.e., node 406 or node 404, the appropriate TM 205 command is sent from SISL service logic 203 to InfoStill 204.

Figure 5:
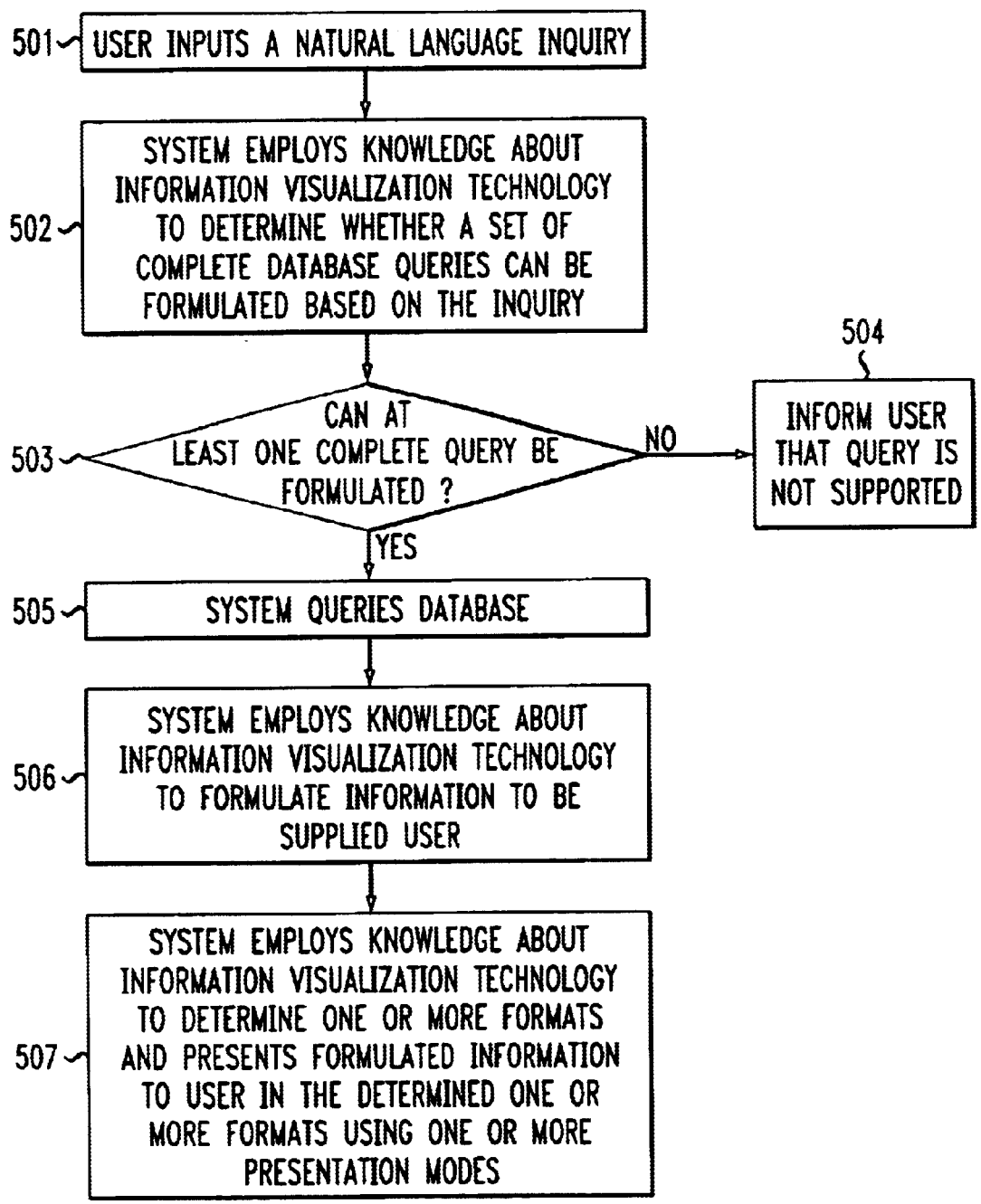
FIG. 5 is a flow chart illustrating the steps employed in an embodiment of the invention.

FIG. 5 is a flow chart illustrating the steps employed in an embodiment of the invention implemented by the system architecture 200 of FIG. 2. The inquiry process starts in step 501 by a user inputting a natural language inquiry. Then, step 502 causes system 200 (FIG. 2) to employ knowledge about information visualization technology to translate the natural language inquiry into one or more database queries by determining whether a set of complete database queries can be formulated and, if so, specifying the one or more database queries to be made. The set can include one or more complete database queries. However, if the set includes only one complete database query, that query is unambiguous. Knowledge about the information visualization technology is encoded in SISL service logic 203 in the form of a reactive constraint graph. Choice nodes represent the alternatives available to the user, while constraint nodes represent required sets of information. Leaf nodes contain a database query and corresponding information visualization views, e.g., presentation formats. Natural language input from the user is matched against the SISL grammars from 202, and appropriate events are sent to the SISL service logic 203. The reactive constraint graph is traversed according to these events. If control halts at a choice node or constraint node, it is determined that further information is needed from the user, and the user is prompted accordingly, as indicated below. Otherwise, if control halts at a leaf node, this indicates that the information given by the user can be translated into a set of complete and unambiguous database query (described in the leaf node). The leaf node also indicates which kind of information visualization views should be displayed. Step 503 tests to determine if at least one database query has been specified. If the test result in step 503 is NO, step 504 informs the user that the query is not supported. If the test result in step 503 is YES, at least one database query has been specified and step 505 queries the appropriate database. In step 506, the system 200 employs knowledge about information visualization technology to formulate information to be supplied to the user. Then, in step 507, the system 200 employs knowledge about information visualization technology to determine one or more formats and presents the formulated information in the determined one or more formats using one or more presentation modes. It should be noted that the presentation formats may be predetermined or dynamically determined from a set of formats. It is further noted that the formats may include text, graphics, screen views, e.g., charts, etc., or the like. Additionally, the presentation modes may include at least text, voice, telephone, web, graphics, other visual or the like and/or any desired combination thereof.

It should be noted that as used herein the phrase "one or more" is intended to mean "one, more than one or any desired combination of the one or more".

Figure 6:
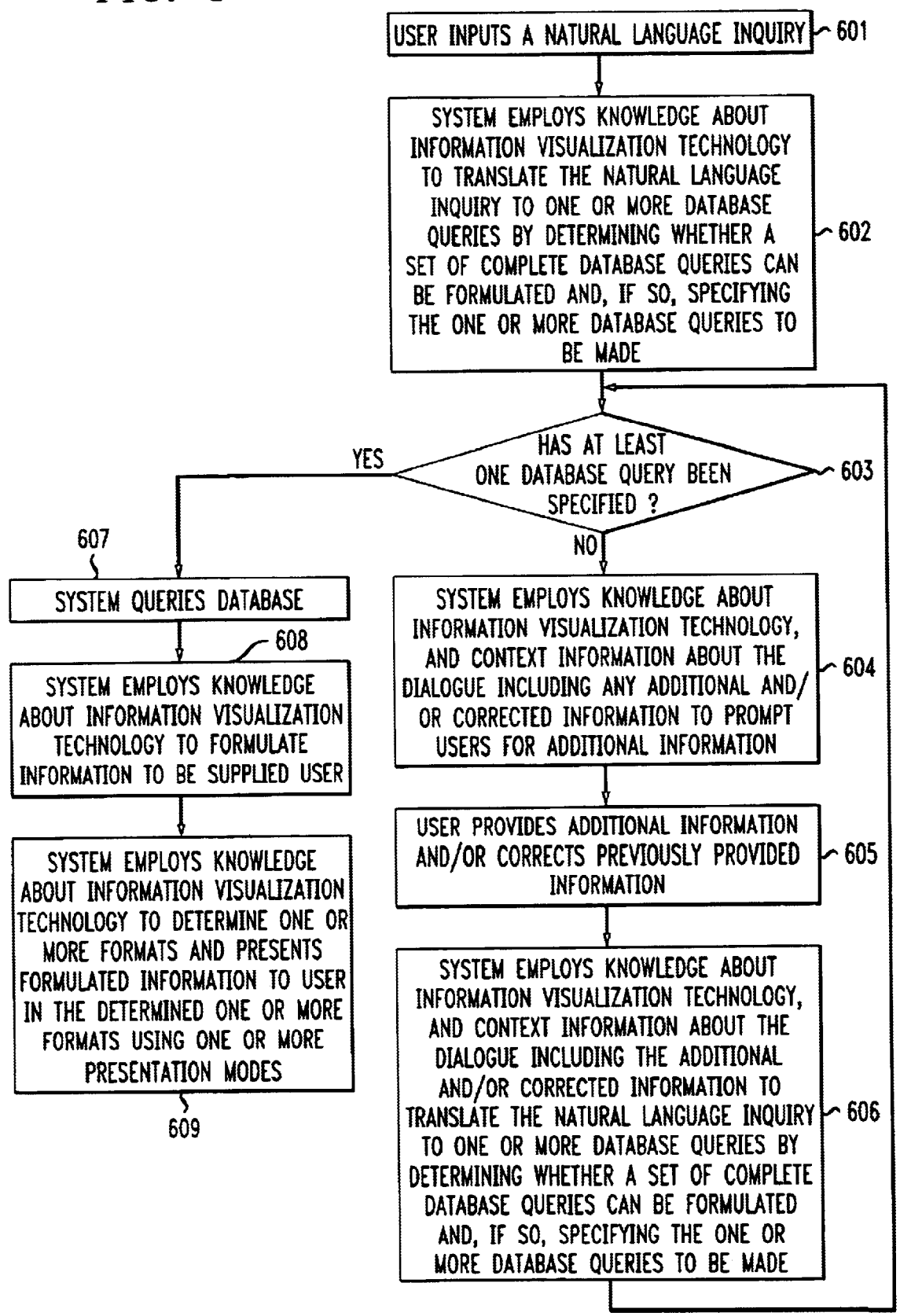
FIG. 6 is a flow chart illustrating the steps employed in another embodiment of the invention.

FIG. 6 is a flow chart illustrating the steps employed in another embodiment of the invention implemented by the system architecture 200 of FIG. 2. The inquiry process starts in step 601 by a user inputting a natural language inquiry. Then, step 602 causes system 200 (FIG. 2) to employ knowledge about information visualization technology to translate the natural language inquiry into one or more database queries by determining whether a set of complete database queries can be formulated and, if so, specifying the one or more database queries to be made. It is again noted that the set can include one or more complete database queries. However, if the set includes only one complete database query that query is unambiguous. This is realized in essentially the same manner as described above in relation to step 502. Step 603 tests to determine if at least one database query has been specified. If the test result in step 603 is NO, in step 604 the system 200 is caused to employ knowledge about information visualization technology, and context information about the dialogue including any additional and/or corrected information to prompt the user for additional information. Context information about the dialogue is implicitly represented by the current state of the reactive constraint graph. It is also encoded in the service monitor 1402 (FIG. 14), in the form of event priorities. Then, in step 605 the user provides additional information and/or corrects previously provided information. Step 606 causes system 200 (FIG. 2) to employ knowledge about information visualization technology, and context information about the dialogue including the addition and/or corrected information to translate the natural language inquiry into one or more database queries by determining whether a set of complete database queries can be formulated and, if so, specifying the one or more database queries to be made. Again, this realized in essentially the same manner as described above in relation to step 502 but with the addition of context information about the dialogue. Thereafter, control is returned to step 603 and steps 603 through 606 are iterated until step 603 yields a YES result. Upon step 603 yielding a YES result, thereby indicating that at least one database query has been specified, step 607 queries the appropriate database. In step 608, the system 200 employs knowledge about information visualization technology to formulate information to be supplied to the user. Then, in step 609, the system 200 employs knowledge about information visualization technology to determine one or more formats and presents the formulated information in the determined one or more formats using one or more presentation modes. It should be noted that the presentation format may be predetermined or dynamically determined from a set of formats. Again, it is further noted that the formats may include text, graphics, screen views, e.g., charts, etc., or the like. Additionally, the presentation modes may include at least text, voice, telephone, web, graphics, other visual or the like and/or any desired combination thereof.

Figure 7:
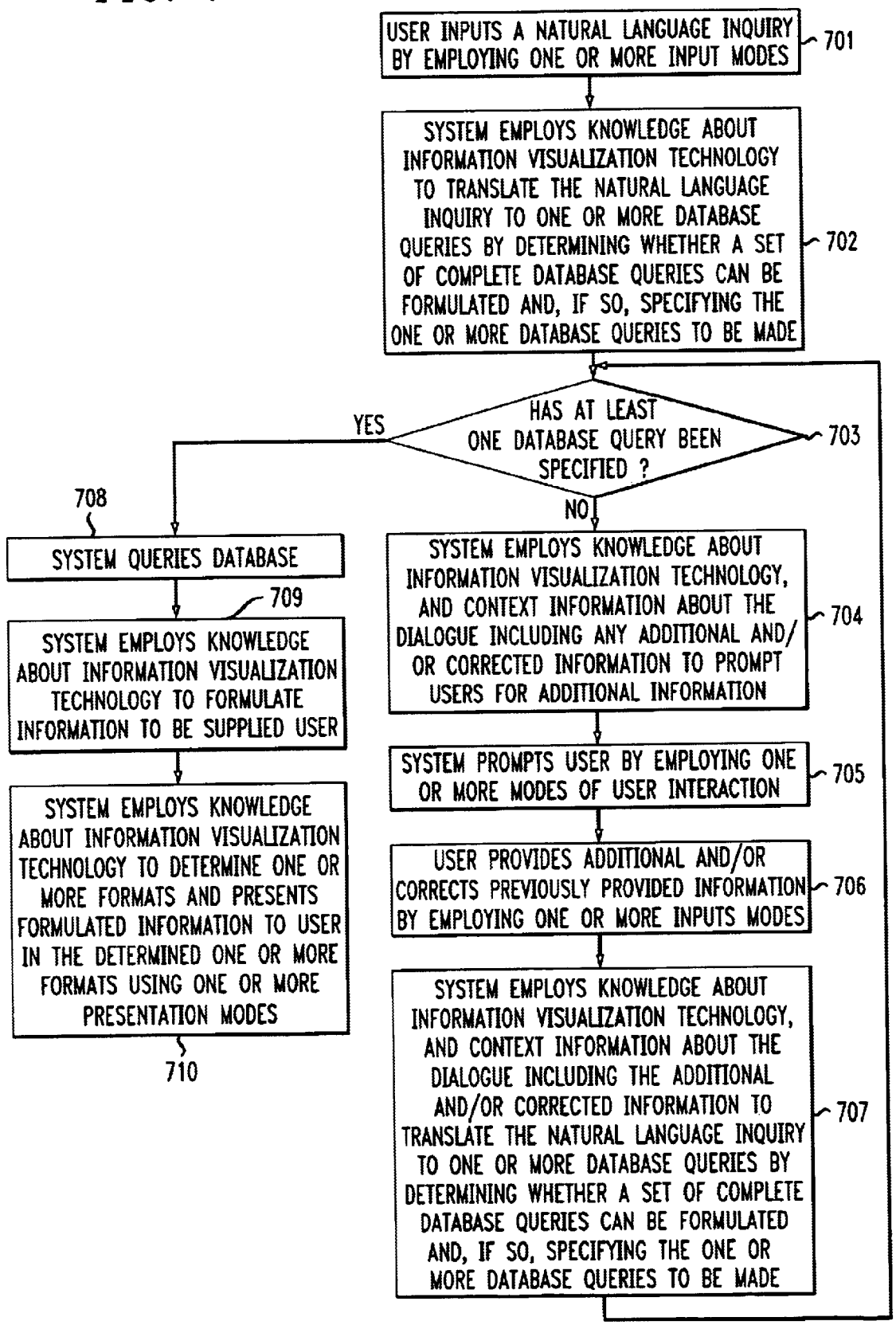
FIG. 7 is a flow chart illustrating the steps employed in yet another embodiment of the invention.

FIG. 7 is a flow chart illustrating the steps employed in yet another embodiment of the invention implemented by the system architecture 200 of FIG. 2. The inquiry process starts in step 701 by a user inputting a natural language inquiry by employing one or more input modes. It is noted that any one of the input modes or any combination of the input modes may be employed to input the natural language inquiry. These input, i.e., interaction, modes may include text, voice, point and click, e.g., mouse, or the like using a telephone, personal computer, microphone, web, mouse, keyboard or the like, or any desired combination thereof. Then, step 702 causes system 200 (FIG. 2) to employ knowledge about information visualization technology to translate the natural language inquiry into one or more database queries by determining whether a set of complete database queries can be formulated and, if so, specifying the one or more database queries to be made. It is again noted that the set can include one or more complete database queries. However, if the set includes only one complete database query that query is unambiguous. This is realized in essentially the same manner as described above in relation to step 502. Step 703 tests to determine if at least one database query has been specified. If the test result in step 703 is NO, in step 704 the system 200 is caused to employ knowledge about information visualization technology, and context information about the dialogue including any additional and/or corrected information to prompt the user for additional information. Context information about the dialogue is implicitly represented by the current state of the reactive constraint graph. It is also encoded in the service monitor 1402 (FIG. 14), in the form of event priorities. Step 705 causes system 200 to prompt the user by employing a prescribed mode of or a combination of modes of a plurality of prescribed modes. In response to the prompts from step 705, the user provides additional information and/or corrects previously provided information via step 706 by employing one or more input modes. In step 707, the system 200 is caused to employ knowledge about information visualization technology, and context information about the dialogue including the additional and/or corrected information to translate the natural language inquiry into one or more database queries by determining whether a set of complete database queries can be formulated and, if so, specifying the one or more database queries to be made. If the set includes only one complete database query that query is unambiguous. Again, this realized in essentially the same manner as described above in relation to step 502 but with the addition of context information about the dialogue. Thereafter, control is returned to step 703 and steps 703 through 707 are iterated until step 703 yields a YES result. Upon step 703 yielding a YES result, thereby indicating that at least one database query has been specified, step 708 queries the appropriate database. In step 709, the system 200 employs knowledge about information visualization technology to formulate information to be supplied to the user. Then, in step 710, the system 200 employs knowledge about information visualization technology to determine one or more formats and presents the formulated information in the determined one or more formats using one or more presentation modes. These presentation modes may include at least text, voice, telephone, web, graphics, other visual or like and/or any desired combination thereof. Again, it is further noted that the formats may include text, graphics, screen views, e.g., charts, etc., or the like. It should also be noted that the presentation formats may be predetermined or dynamically determined from a set of formats.

Figure 8:
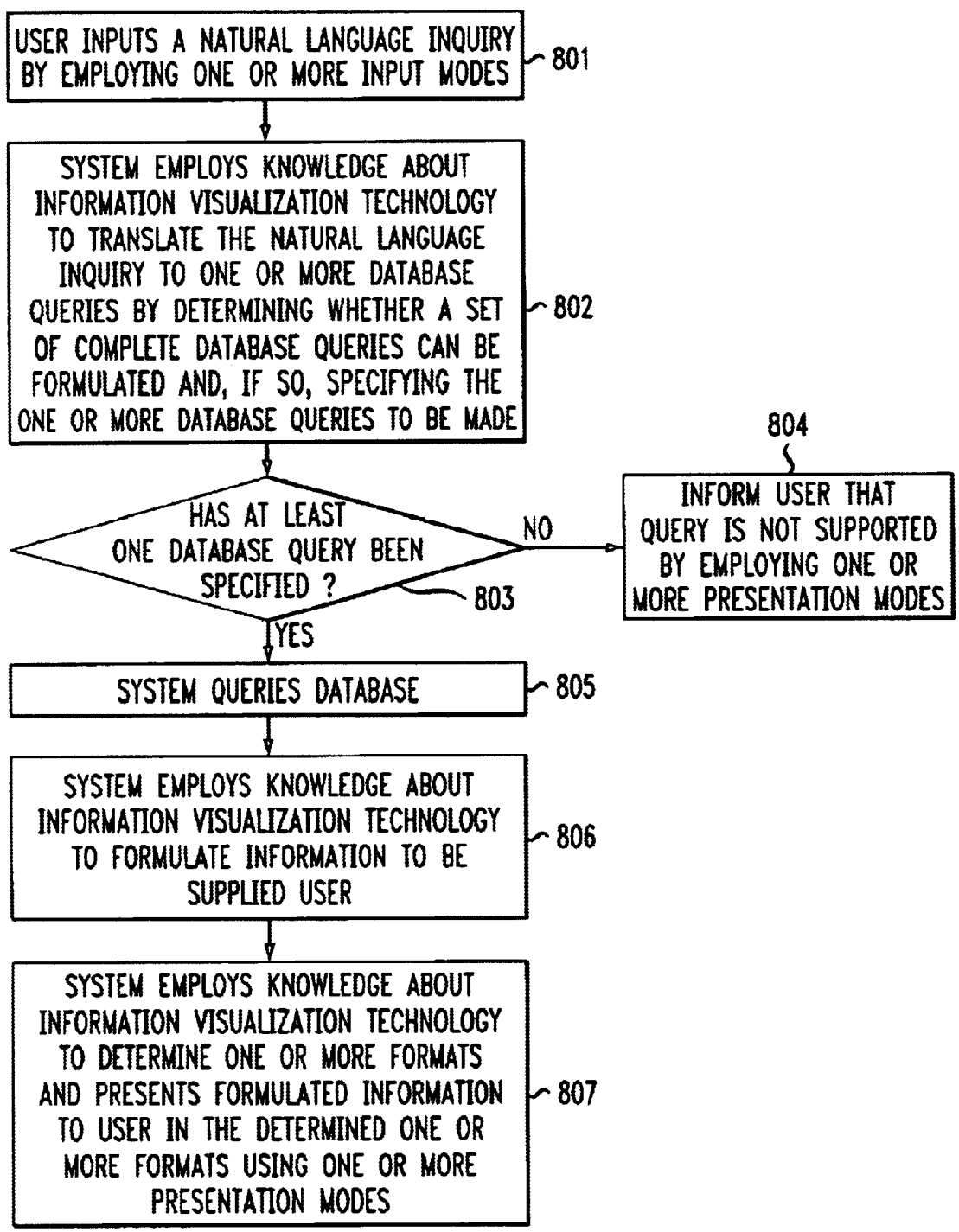
FIG. 8 is a flow chart illustrating the steps employed in still another embodiment of the invention.

FIG. 8 is a flow chart illustrating the steps employed in still another embodiment of the invention implemented by the system architecture 200 of FIG. 2. The inquiry process starts in step 801 by a user inputting a natural language inquiry by employing one or more input modes. Again, these input, i.e., interaction, modes may include text, voice, point and click, e.g., mouse, or the like using a telephone, personal computer, microphone, web, mouse, keyboard or the like, or any desired combination thereof. Then, step 802 causes system 200 (FIG. 2) to employ knowledge about information visualization technology to translate the natural language inquiry into one or more database queries by determining whether a set of complete database queries can be formulated and, if so, specifying the one or more database queries to be made. If the set includes only one complete database query that query is unambiguous. This is realized in essentially the same manner as described above in relation to step 502. Step 803 tests to determine if at least one database query has been specified. If the test result in step 803 is NO, in step 804 the user is informed by employing one or more presentation modes that the query is not supported. If the test result in 803 is YES, at least one database query has been specified and step 805 queries the appropriate database. In step 806, the system 200 employs knowledge about information visualization technology to formulate information to be supplied to the user. Then, in step 807 the system 200 employs knowledge about information visualization technology to determine one or more formats and presents the formulated information in the determined one or more formats using one or more presentation modes. The presentation modes may include at least text, voice, telephone, web, graphics, other visual or the like and/or any desired combination thereof Again, it is further noted that the formats may include text, graphics, screen views, e.g., charts, etc., or the like. It should also be noted that the presentation formats may be predetermined or dynamically determined from a set of formats.

Figure 9:
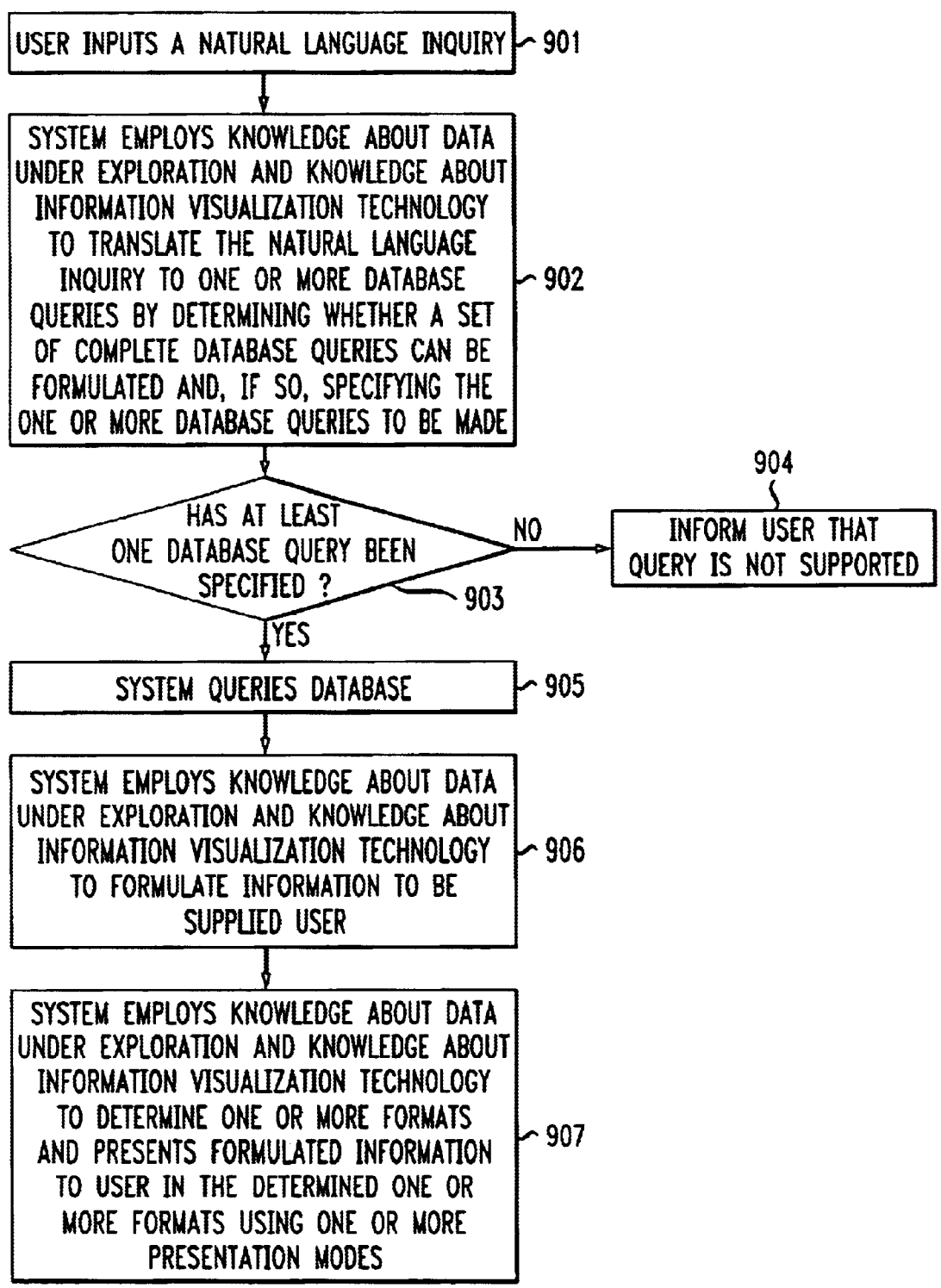
FIG. 9 is a flow chart illustrating the steps employed in a prescribed embodiment of the invention.

FIG. 9 is a flow chart illustrating the steps employed in an embodiment of the invention implemented by the system architecture 200 of FIG. 2. The inquiry process starts in step 901 by a user inputting a natural language inquiry. Then, step 902 causes system 200 (FIG. 2) to employ knowledge about the data under exploration and knowledge about information visualization technology to translate the natural language inquiry into one or more database queries by determining whether a set of complete database queries can be formulated and, if so, specifying the one or more database queries to be made. Note that if the set includes only one complete database query that query is unambiguous. Knowledge about the information visualization technology and knowledge about the data under exploration is encoded in SISL service logic 203 in the form of a reactive constraint graph. Choice nodes represent the alternatives available to the user, while constraint nodes represent required sets of information. Leaf nodes contain a database query and corresponding information visualization views. Natural language input from the user is matched against the SISL grammars from 202, and appropriate events are sent to the SISL service logic 203. The reactive constraint graph is traversed according to these events. If control halts at a choice node or constraint node, it is determined that further information is needed from the user, and the user is prompted accordingly. Otherwise, if control halts at a leaf node, this indicates that the information given by the user can be translated into a set of complete and unambiguous database query (described in the leaf node). The leaf node also indicates which kind of information visualization views should be displayed. Step 903 tests to determine if at least one database query has been specified. If the test result in step 903 is NO, step 904 informs the user that the query is not supported. If the test result in step 903 is YES, at least one database query has been specified and step 905 queries the appropriate database. In step 906, the system 200 employs domain knowledge about data under exploration and knowledge about information visualization technology to formulate information to be supplied to the user. Then, in step 907, the system 200 employs knowledge about data under exploration and knowledge about information visualization technology to determine one or more formats and presents the formulated information to the use in the determined one or more formats using one or more presentation modes. It should be noted that the presentation format may be predetermined or dynamically determined from a set of formats. Again, it is further noted that the formats may include text, graphics, screen views, e.g., charts, etc., or the like. Additionally, the presentation modes may include at least text, voice, telephone, web, graphics, other visual or the like and/or any desired combination thereof.

Figure 10:
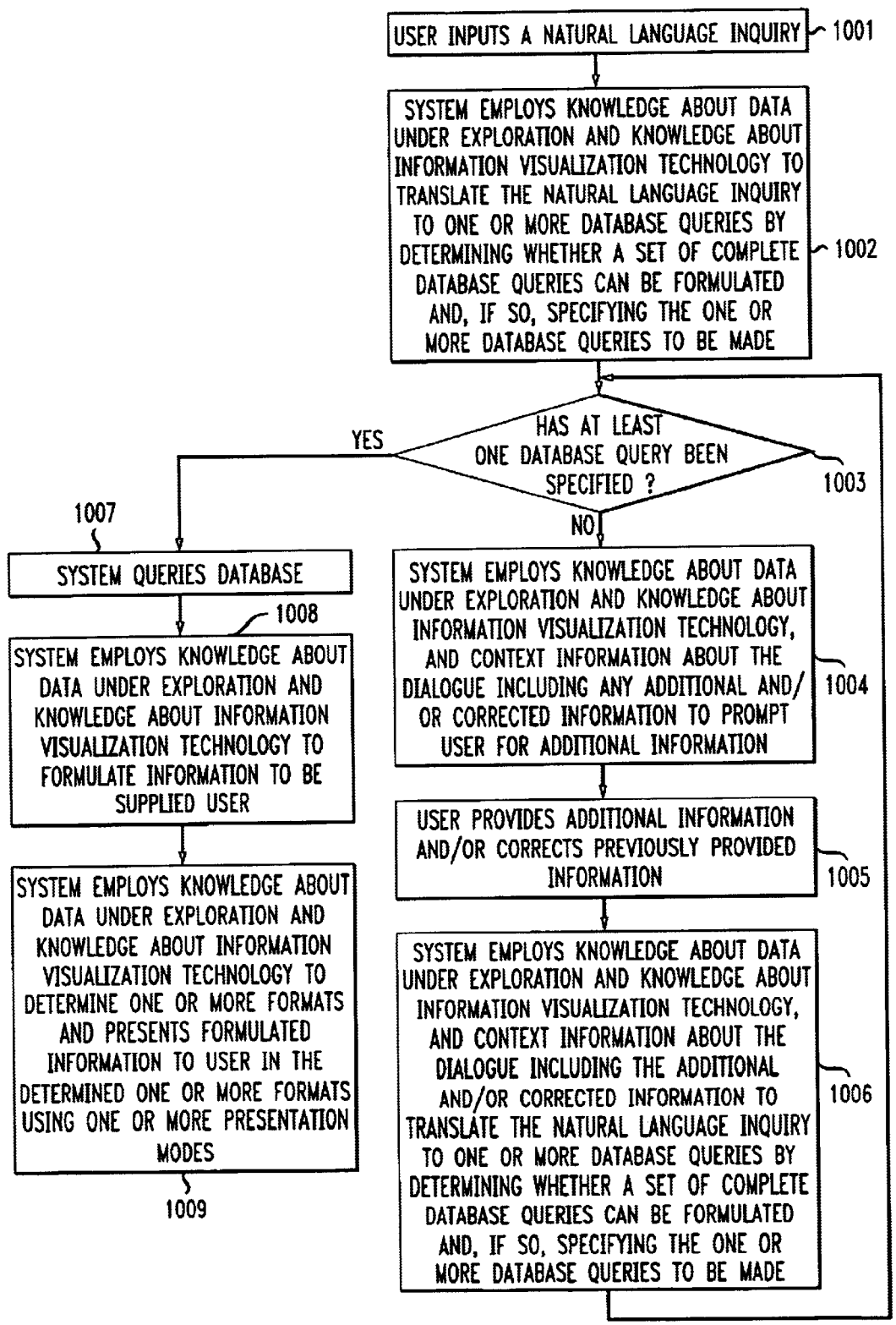
FIG. 10 is a flow chart illustrating the steps employed in another prescribed embodiment of the invention.

FIG. 10 is a flow chart illustrating the steps employed in another embodiment of the invention implemented by the system architecture 200 of FIG. 2. The inquiry process starts in step 1001 by a user inputting a natural language inquiry. Then, step 1002 causes system 200 (FIG. 2) to employ knowledge about the data under exploration and knowledge about information visualization technology to translate the natural language inquiry into one or more database queries by determining whether a set of complete database queries can be formulated and, if so, specifying the one or more database queries to be made. Note that if the set includes only one complete database query that query is unambiguous. This is realized in essentially the same manner as described above in relation to step 902. Step 1003 tests to determine if at least one database query has been specified. If the test result in step 1003 is NO, in step 1004, the system 200 is caused to employ knowledge about data under exploration and knowledge about information visualization technology, and context information about the dialogue including any additional and/or corrected information to prompt the user for additional information. Context information about the dialogue is implicitly represented by the current state of the reactive constraint graph. It is also encoded in the service monitor 1402 (FIG. 14), in the form of event priorities. Then, in step 1005 the user provides additional information and/or corrects previously provided information. Step 1006 causes system 200 (FIG. 2) to employ knowledge about the data under exploration and knowledge about information visualization technology, and context information about the dialogue including the additional and/or corrected information to translate the natural language inquiry into one or more database queries by determining whether a set of complete database queries can be formulated and, if so, specifying the one or more database queries to be made. Note that if the set includes only one query that query is unambiguous. Again, this realized in essentially the same manner as described above in relation to step 902 but with the addition of context information about the dialogue. Thereafter, control is returned to step 1003 and steps 1003 through 1006 are iterated until step 1003 yields a YES result. Upon step 1003 yielding a YES result, thereby indicating that at least one database query has been specified, step 1007 queries the appropriate database. In step 1008, the system 200 employs knowledge about data under exploration and knowledge about information visualization technology to formulate information to be supplied to the user. Then, in step 1009, the system 200 employs knowledge about data under exploration and knowledge about information visualization technology to determine one or more formats and presents the formulated information to the use in the determined one or more formats using one or more presentation modes. It should be noted that the presentation format may be predetermined or dynamically determined from a set of formats. Again, it is further noted that the formats may include text, graphics, screen views, e.g., charts, etc., or the like. Additionally, the presentation modes may include at least text, voice, telephone, web, graphics, other visual or the like and/or any desired combination thereof.

Figure 11:
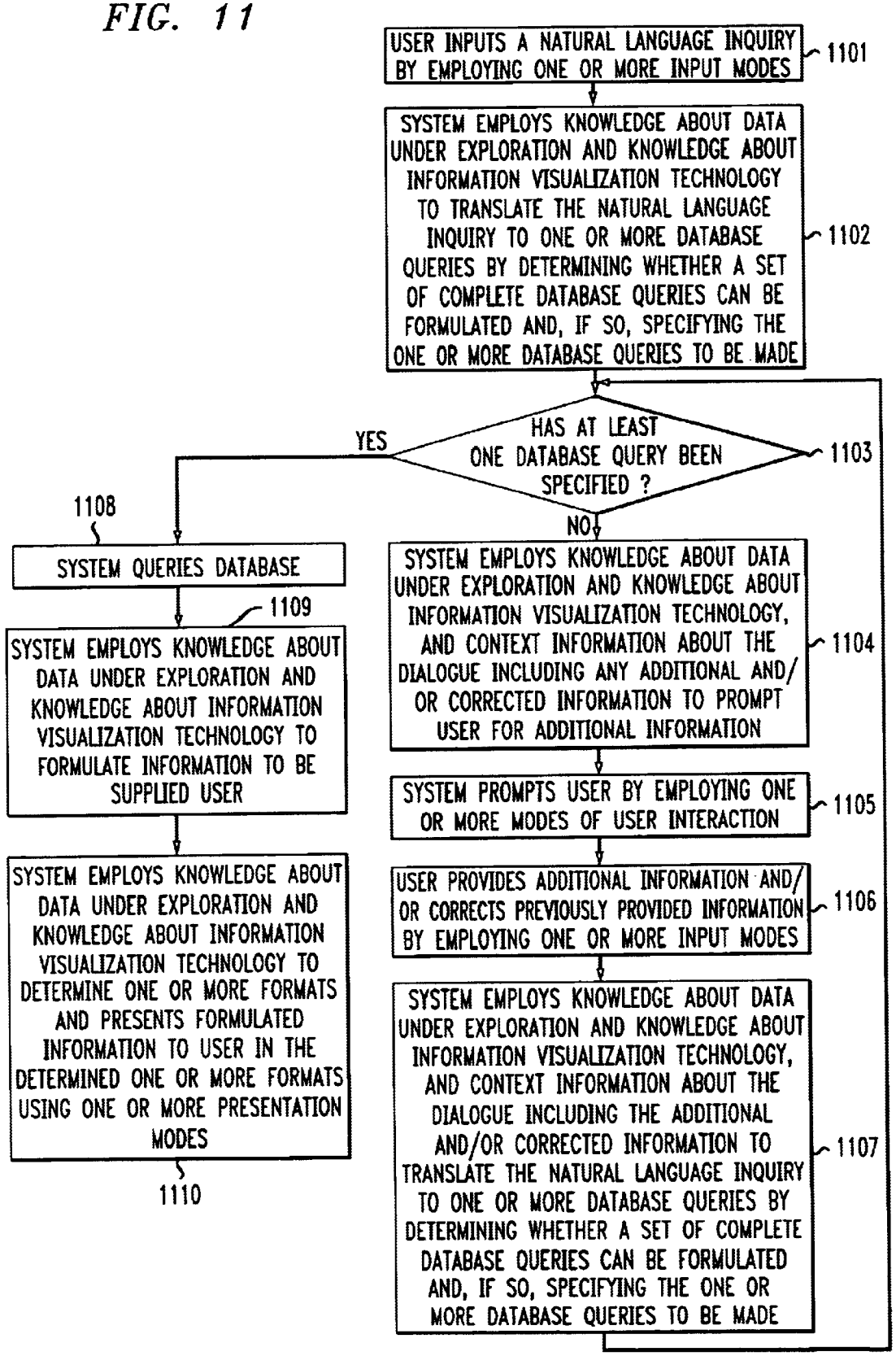
FIG. 11 is a flow chart illustrating the steps employed in yet another prescribed embodiment of the invention.

FIG. 11 is a flow chart illustrating the steps employed in yet another embodiment of the invention implemented by the system architecture 200 of FIG. 2. The inquiry process starts in step 1101 by a user inputting a natural language inquiry by employing one or more input modes. Again, these input, i.e., interaction, modes may include text, voice, point and click, e.g., mouse, or the like using a telephone, personal computer, microphone, web, mouse, keyboard or the like, or any desired combination thereof. Then, step 1102 causes system 200 (FIG. 2) to employ knowledge about the data under exploration and knowledge about information visualization technology to translate the natural language inquiry into one or more database queries by determining whether a set of complete database queries can be formulated and, if so, specifying the one or more database queries to be made. Note that if the set includes only one complete database query that query is unambiguous. This is realized in essentially the same manner as described above in relation to step 902. Step 1103 tests to determine if at least one database query has been specified. If the test result in step 1103 is NO, in step 1104 the system 200 is caused to employ knowledge about data under exploration and knowledge about information visualization technology, and context information about the dialogue including any additional and/or corrected information to prompt the user for additional information. Context information about the dialogue is implicitly represented by the current state of the reactive constraint graph. It is also encoded in the service monitor 1402 (FIG. 14), in the form of event priorities. Step 1105 causes system 200 to prompt the user by employing a prescribed mode of or a combination of modes of a plurality of prescribed modes. In response to the prompts from step 1105, the user provides additional information and/or corrects previously provided information via step 1106 by employing one or more input modes. In step 1107, the system 200 is caused to employ knowledge about the data under exploration and knowledge about information visualization technology, and context information about the dialogue including the additional and/or corrected information to translate the natural language inquiry into one or more database queries by determining whether a set of complete database queries can be formulated and, if so, specifying the one or more database queries to be made. Note that if the set includes only one complete query that query is unambiguous. Again, this realized in essentially the same manner as described above in relation to step 902 but with the addition of context information about the dialogue. Thereafter, control is returned to step 1103 and steps 1103 through 1107 are iterated until step 1103 yields a YES result. Upon step 1103 yielding a YES result, thereby indicating that at least one database query has been specified and step 1108 queries the appropriate database. In step 1109, the system 200 employs domain knowledge about data and information visualization technology to formulate information to be supplied to the user. Then, in step 1110, the system 200 employs knowledge about data under exploration and knowledge about information visualization technology to determine one or more formats and presents the formulated information to the use in the determined one or more formats using one or more presentation modes. These presentation modes may include at least text, voice, telephone, web, graphics, other visual or the like and/or any desired combination thereof Again, it is further noted that the formats may include text, graphics, screen views, e.g., charts, etc., or the like. It should also be noted that the presentation formats may be predetermined or dynamically determined from a set of formats.

Figure 12:
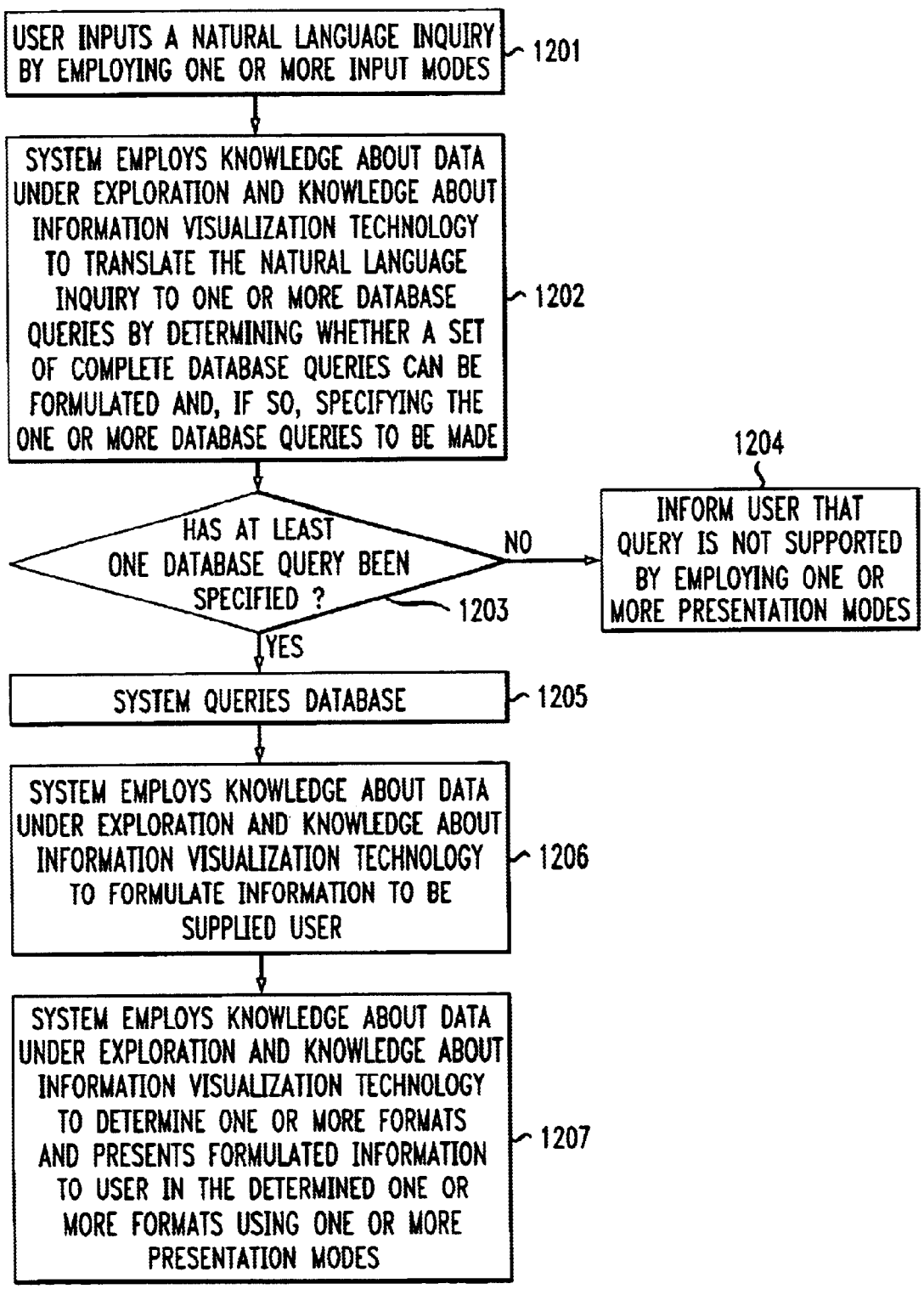
FIG. 12 is a flow chart illustrating the steps employed in still another prescribed embodiment of the invention.

FIG. 12 is a flow chart illustrating the steps employed in still another embodiment of the invention implemented by the system architecture 200 of FIG. 2. The inquiry process starts in step 1201 by a user inputting a natural language inquiry by employing one or more input modes. Again, these input, i.e., interaction, modes may include text, voice, point and click, e.g., mouse, or the like using a telephone, personal computer, microphone, web, mouse, keyboard or the like, or any desired combination thereof. Then, step 1202 causes system 200 (FIG. 2) to employ knowledge about the data under exploration and knowledge about information visualization technology to translate the natural language inquiry into one or more database queries by determining whether a set of complete database queries can be formulated and, if so, specifying the one or more database queries to be made. Note that if the set includes only one complete database query that query is unambiguous. This is realized in essentially the same manner as described above in relation to step 902. Step 1203 tests the determination of step 1202 if a complete and unambiguous query can be formulated. If the test result in step 1203 is NO, in step 1204 the user is informed by employing one or more presentation modes that the query is not supported. If the test result in step 1203 is YES, at least one database query has been specified and step 1205 queries the appropriate database. In step 1206, the system 200 employs knowledge about data under exploration and knowledge about information visualization technology to formulate information to be supplied to the user. Then, in step 1207, the system 200 employs knowledge about data under exploration and knowledge about information visualization technology to determine one or more formats and presents the formulated information to the use in the determined one or more formats using one or more presentation modes. The presentation modes may include at least text, voice, telephone, web, graphics, other visual or the like and/or any desired combination thereof. Again, it is further noted that the formats may include text, graphics, screen views, e.g., charts, etc., or the like. It should also be noted that the presentation formats may be predetermined or dynamically determined from a set of formats.

Figure 13:
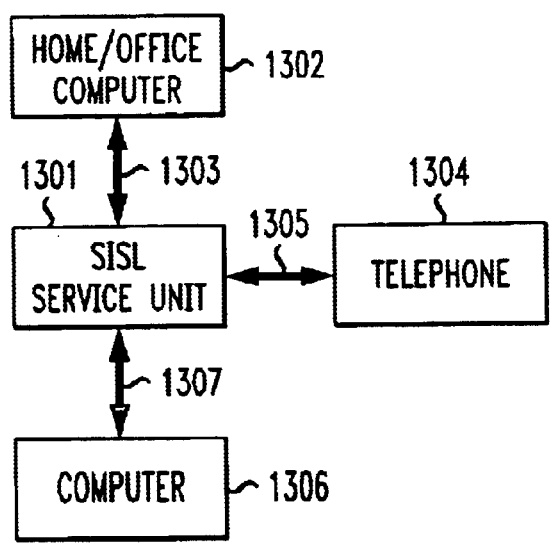
FIG. 13 shows, in simplified block diagram form, details of an interactive system in which the invention may be advantageously employed.

FIG. 13 shows, in simplified block diagram form, details of an interactive system in which the invention may be advantageously employed. It should be noted that the arrangement shown in FIG. 13 is but one example of an application of the invention. Indeed, a plurality of different user interfaces and/or one more identical user interfaces may be employed as desired.

Specifically, shown in FIG. 13 is SISL (Several Interfaces, Single Logic) service unit 1301; home/office computer 1302 used as a customer and/or provider interface, including automatic speech recognition having a natural language understanding, if desired, that is interfaced to SISL service unit 1301 via an Internet link 1303; telephone 1304 also used as a customer and/or provider interface that is interfaced to SISL service unit 1301 via a telephone network 1305 including, for example, touch-tone, i.e., multi-frequency, signaling; and computer 1306 used as a customer and/or provider interface, which may also have automatic speech recognition including natural language understanding, that is interfaced to SISL service unit 1301 via a local area network (LAN). A key advantage of SISL is that all user interfaces to a service share the same single service logic. SISL provides a clean separation between the service logic and the software for a variety of user interfaces including but not limited to Java applets, HTML pages, speech-based natural language dialog, and telephone-based voice access. In this example, SISL is implemented using the JAVA programming language.

At the outset it is felt best to describe some of the principles employed in implementing the flexible interactive service including an embodiment of the invention. For simplicity and clarity of exposition, these principles will be presented in the context of a so-called Any-Time Teller banking service employing the invention. The Any-Time Teller is an interactive banking service. The service is login protected; customers must authenticate themselves by entering an identifier (login) and PIN, i.e., personal identification number, (password) to access the functions. As customers may have many money accounts, most functions require the customer to select the account(s) involved. Once authenticated, the customer may:

Make a deposit.

Make a withdrawal. The service makes sure the customer has enough money in the account, then withdraws the specified amount.

Transfer funds between accounts. The service prompts the customer to select a source and target account, and a transfer amount, and performs the transfer if (1) the customer has enough money in the source account, and (2) transfers are permitted between the two accounts.

Get the balance of an account. Display the balance with respect to all posted transactions.

View the transactions of an account. Display the transactions for the selected account.

See the last transaction. Display the last action the customer performed.

The transfer capability of the Any-Time Teller requires the collection of three events: the source account (src), target account (tgt), and dollar amount (amt). There are five constraints that those input events must meet before a transfer can take place:

c1: src must be a valid account c2: tgt must be a valid account c3: amt must be greater than zero c4: amt must be less than or equal to the balance of src c5: the bank must allow transfers from src to tgt The service should check whether or not a constraint is violated as soon as possible; hence, it must be prepared to react when only a subset of the three events is present. The service must then prompt for the remaining events.

Some basic principles are now considered related to the design and implementation of interactive services with multiple and varied user interfaces. These principles are especially important in the presence of multiple interfaces including those based on spoken natural language.

Lesser Order=greater Freedom

The source account, target account, and dollar amount of the transfer capability should be independent events that can be collected in any order, where all three events are necessary to perform a transfer. By making explicit independent and dependent events, it in clear what events may be reordered without affecting the behavior of the service. This points the way to our first principle of the service specification:

Principle 1: Specify the service logic as a set of constraints on events and introduce a constraint between two events only when absolutely necessary for the correct functioning of a service. That is, the service logic should be able to accept independent input events in different orders.

Eliminate Errors Only

It is often desirable for a service to respond as soon as possible with error conditions about user input. Since a constraint on the input events may refer to any arbitrary subset of those events, it is desirable that the service logic should be able to accept arbitrary subsets of events at any time.

Principle 2: The service logic should accept an incomplete input, i.e., subsets of the universe of possible events.

I Take That Back!

Unfortunately, humans often change their mind and/or make mistakes. Whenever possible, services must accommodate these shortcomings of our species, providing a capability to correct information or back out of a transaction. This leads to our third principle:

Principle 3: The service logic should allow the user to back up to correct or update previously submitted information at any time. A closely related principle is:

Principle 4: The service logic should allow the user to back up to previous points in the service.

Ready or not?

Services that obey the above principles generalize from linear user interactions to potentially allow multiple points of interaction to be enabled at a given instant. This information serves as an abstraction of the current control point of the service, and can be handled in a different manner by different user interfaces. For example, in automatic speech recognition interfaces, the information about currently enabled events is used by the user interface in two ways:

to appropriately prompt the user for information, thus compensating for the lack of visual cues; and to effectively parse the information provided by the user.

A user interface need not respond to all currently enabled events of the service. Thus, different user interfaces can formulate different queries to the user even though the control point in the underlying service logic, as revealed by the current set of enabled events, is the same. The decoupling that we are seeking between the user interface and the service logic, therefore points the way to our last principle of the service specification:

Principle 5: At any point in the service, the service logic must automatically report to the user interfaces all currently enabled events, user prompts, help, and ways to revert back to previous points in the service.

User interfaces have two main responsibilities with respect to the SISL architecture that reflect the two-way information flow between the user interface and service logic:

Based on the events received from the service logic, via the service monitor, prompt the user to provide the appropriate information and respond if the user requests help.

Collect the information from the user and transform the information into events to be sent to the service logic, via the service monitor.

Indeed, any user interface (UI) that performs these functions can be employed in conjunction with a SISL service logic. Additionally, SISL provides a convenient framework for designing and implementing web-based, applet-based, automatic speech recognition-based and telephone voice-based interfaces. To implement such user interfaces, the UI designer need only specify two functions corresponding to the prompt and help mechanism. For automatic speech recognition interfaces, a set of speech grammars, i.e., the input to a speech recognition engine that permits it to efficiently and effectively recognize spoken input, together with a third function that specifies which grammars to enable is also required.

The required functions are:

A prompt function that generates the string to be given as the prompt to the user. An example, in pseudo code form is shown below. The SISL infrastructure automatically causes automatic speech recognition-based interfaces to speak the prompt string. Web-based interfaces automatically display the prompt string, as well as, radio buttons corresponding to the possible transaction choices. For the other prompt events, text fields are automatically displayed, while submit buttons are automatically displayed for enabled events that allow the user to return to earlier points in the service.

A help function that generates the string to be given as the prompt to the user. An example, in pseudo code form is also described below.

A grammar function that enables the correct set of grammar rules; this function is only needed for automatic speech recognition-based interfaces. An example, in pseudo code form is described below.

As indicated, portions of the prompt and help functions shared by an automatic speech recognition-based interface, web-based interface and telephone-based voice interface for the Any-Time Teller banking service in pseudo code form. The prompt and help functions pseudo code is self explanatory and is as follows:

```
prompt(req_events, opt_events, choice_events, uplabels) {
    ...
    if (req_events.contains_any_of("startDeposit", "startWithdrawal",
                    "startTransfer","startBalance") {
        return("What transaction would you like to do?");
    };
    ...
    if (req_events.contains("startTransfer"))
        transaction_type.set("Transfer");
    ...
    if (transaction_type.equals("Transfer")) {
        if (req_events.contains({"src", "tgt", "amount"})) {
            return("Please specify the source account, target account,
                    and the amount you would like to transfer.")
        }
        ...
    };
}
help(req_events, opt_events, choice_events, uplabels) {
    ...
    if (req_events.contains_any_of("startDeposit", "startWithdrawal",
                    "startTransfer","startBalance") {
        return("You may make a deposit, withdrawal or transfer. Or you
may quit the service");
    }
}
```

Portions of the grammar rules, against which the automatic speech recognition engine will parse spoken input from the user, pseudo code is self explanatory and is as follows:

```
<request> = ([I (want to | would like to)] | I'd like to )| please;
<transfer_request> = [<request>] (make a transfer | transfer [money]) {startTransfer};
public <transfer> = [<transfer_request> [<src_tgt_amount> | <src_tgt> | <src_amount> |
            <tgt_amount> | <src> | <tgt> | <amount>];
public <src_tgt_amount> = [<transfer_request>]
```

-continued

```
        (<sum> from [my] <account_type> {src} [account]
        (to | into) [my] <account_type> {tgt} [account]]
        <sum> (to | into) [my] <account_type> {tgt} [account]
        from [my] <account_type> {src} [account] )|
        from [my] <account_type> {src} [account],
        [<transfer_request>] (<sum>)
        (to | into) [my] <account_type> {tgt} [account];
public <src_amount> = [<transfer_request>] (<sum> from [my] <account_type> {src}
[account])|
        from [my] <account_type> {src} [account], [<transfer_request>] (<sum>);
...
<uprequest> = [<request>] [go] [(back [up]| up] [to] [the];
public <upMainMenu> = [<uprequest>]Main Menu {upMainMenu};.
```

A portion of the associated grammar function shared by an automatic speech recognition-based interface and a telephone-based voice interface pseudo code is self explanatory and is as follows:

```
enableRules(req_events, opt_events, choice_events, uplabels) {
    evts = req_events + opt_events + choice_events + uplabels;
    if (evts.contains({"src", "tgt", "amount"})) {
        grammar.enable("<src_tgt_amount>");
    }
    if (evts.contains({"src","amount"})) {
        grammar.enable("<src_amount>");
    }
}
...
if (uplabels.contains("upMainMenu")) {
    grammar.enable("<upMainMenu>");
}
    }.
```

From these functions and grammars, the SISL infrastructure automatically coordinates the collection and event transformation mechanisms, and integrates the user interface with the service logic and the service monitor. For automatic speech recognition-based interfaces, the SISL infrastructure automatically generates a desktop interface based on JAVA Speech API (Application Programming Interface). To enable telephone-based voice access to the service, SISL automatically generates VoiceXML pages, which specify the voice dialog to be carried out on a telephony platform. For Web-based interfaces, the SISL infrastructure automatically generates HTML (Hypertext Markup Language) pages. It is noted that SISL provides a mechanism for the UI designer to customize the look and feel of the interface.

Figure 14:
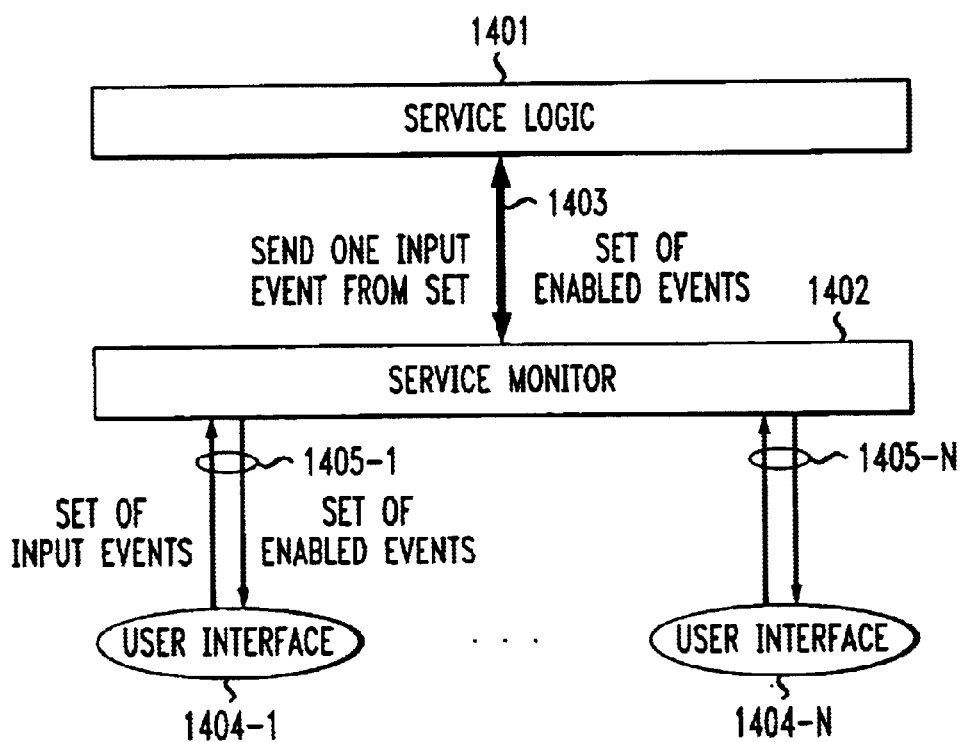
FIG. 14 shows, in simplified block form, details of the SISL (Several Interfaces, Single Logic) architecture employed in the embodiment of FIG. 13.

FIG. 14 shows, in simplified block form, details of the SISL (Several Interfaces, Single Logic) architecture employed in the embodiment of FIG. 13. The SISL architecture together with the event communication protocol provides modularity between the service logic 1401 and user interfaces 1404. In particular, two features of the event communication protocol allow service logic 1401 to function completely without knowledge of the specifics of the individual user interfaces 1404. These features are: (1) events are multicast from service logic 1401 via service monitor 1402 to user interfaces 1404 and, consequently, service logic 1401 does not need to know the destinations of these events; and (2) the source of the events from the user interfaces 1404 is not recorded and, consequently, the service logic 1401 does not know which one or more of user interfaces 1404 sent the events. Service monitor 1402 is responsible for maintaining this communication protocol. This modularity allows service providers to provide interchangeable user interfaces 1404, or add new ones, to a single consistent source of service logic and data.

Specifically, shown in FIG. 14 are service logic unit 1401, service monitor 1402 and user interfaces 1404-1 through 1404-N. The key principle underlying SISL is that all user interfaces 1404 to a service share a single service logic 1401. All communications between the service logic 1401 and its multiple user interfaces 1404 are through events, via a service monitor 1402. Events from the service logic 1401 are broadcast to the user interfaces 1404 via 1403 to the service monitor 1402 and, then, via 1405 as a set of enabled events to the user interfaces 1404. At the outset of the service, for example the Any-Time Teller banking service, each user interface 1404 registers with the service monitor 1402 to indicate which events it is interested in receiving. After collecting information from the user, the user interfaces 1404 send events to the service monitor 1402 via bi-directional links 1405; the service monitor 1402 does not record the source of these events. The service monitor 1402 passes the events, one at a time, via 1403 to the service logic 1401. Details of a service monitor, which can be advantageously employed for service monitor 1402, are described in U.S. patent application Ser. No. 09/386,093, filed Aug. 30, 1999 and assigned to the assignee of this application.

Event communication supports decoupling of the service logic 1401 and the user interfaces 1404, and allows service providers to provide interchangeable user interfaces 1404, or add new ones, to a single consistent source of service logic 1401 and data.

In each round of interaction, the SISL infrastructure automatically sends out a set of events via 1403 from the service logic 1401 to the service monitor 1402, corresponding to the events that are currently enabled in the service logic 1401. There are three kinds of events: prompt events, up events, and notify events. Prompt events indicate to the user interface what information to communicate to the user and what information the service is ready to accept. There are three kinds of prompt events:

prompt_choice events are disjunctive choices currently enabled in the service logic 1401. For example, after the user has successfully logged into the Any-Time Teller banking service, a choice among the different transaction types is enabled. The service logic 1401 sends a prompt_choice_deposit, prompt_choice_withdrawal event, and a prompt_choice_transfer event, and so forth, via 1403 to the service monitor 1402.

prompt_req events are the events currently required by the service logic 1401. For example, suppose the user has chosen to perform a transfer transaction. The Any-Time Teller requires that the user input a source account, a transfer account, and amount, and hence sends prompt_req_src, prompt_req_tgt, and prompt_req_amt events via 1403 to the service monitor 1402.

prompt_opt events are events enabled in the service logic 1401, for which the user may correct previously given information. For example, suppose the user is performing a transfer and has already provided his/her source and target accounts, but not the amount. The service logic 1401 sends prompt_opt_src, prompt_opt_tgt, and prompt_req_amt events via 1403 to the service monitor 1402. This indicates that the user may override the previously given source and target accounts with new information.

Up events correspond to prior points in the service logic 401 to which the user may go back. For example, the service logic 1401 sends an up_MainMenu event via 1403 to the service monitor 1402. This allows the user to abort any transaction and go back up to the main menu.

Notify events are simply notifications that the user interface 1404 should give the user; for example, that a transaction has completed successfully or that information provided by the user was incorrect or inconsistent.

Figure 15:
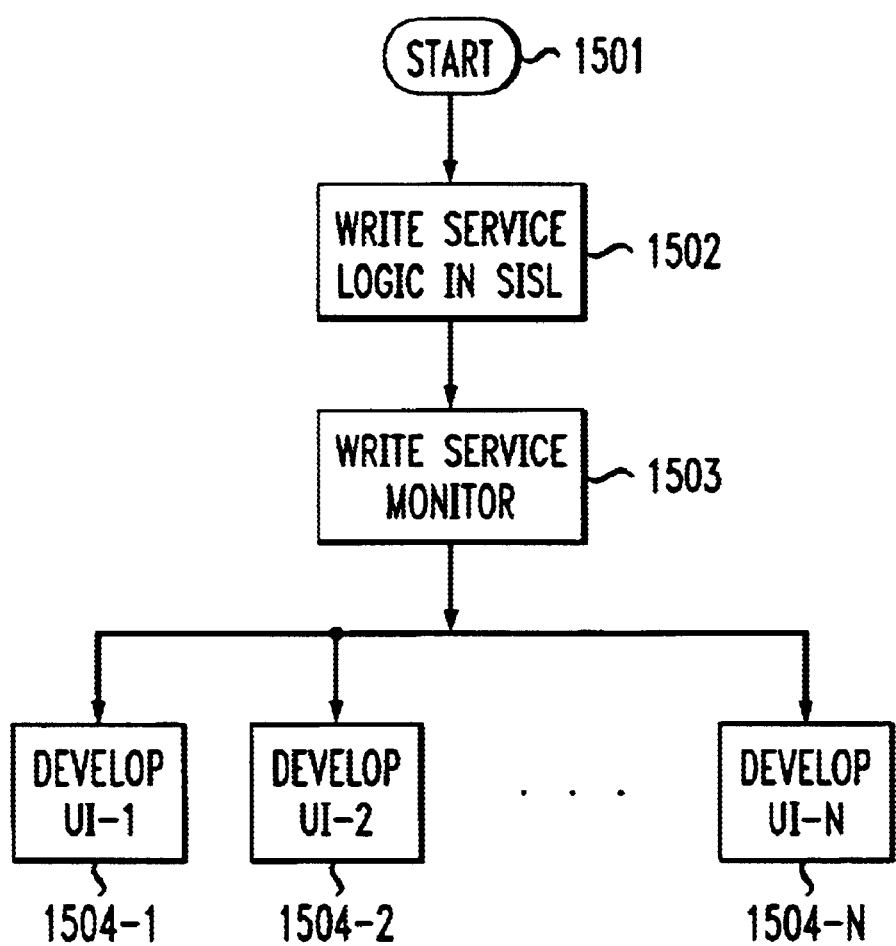
FIG. 15 is a flowchart illustrating the steps in implementing the SISL architecture of FIG. 14.

FIG. 15 is a flowchart illustrating the steps in implementing the SISL architecture of FIG. 14. Specifically, the implementation process is started via step 1501. Then, step 1502 causes the SISL service logic to be written in SISL. Step 1503 causes the service monitor 1402 to be written. Thereafter, a plurality of user interfaces UI-1 thorough UI-N are developed in steps 1504-1 through 1504-N.

Figure 16:
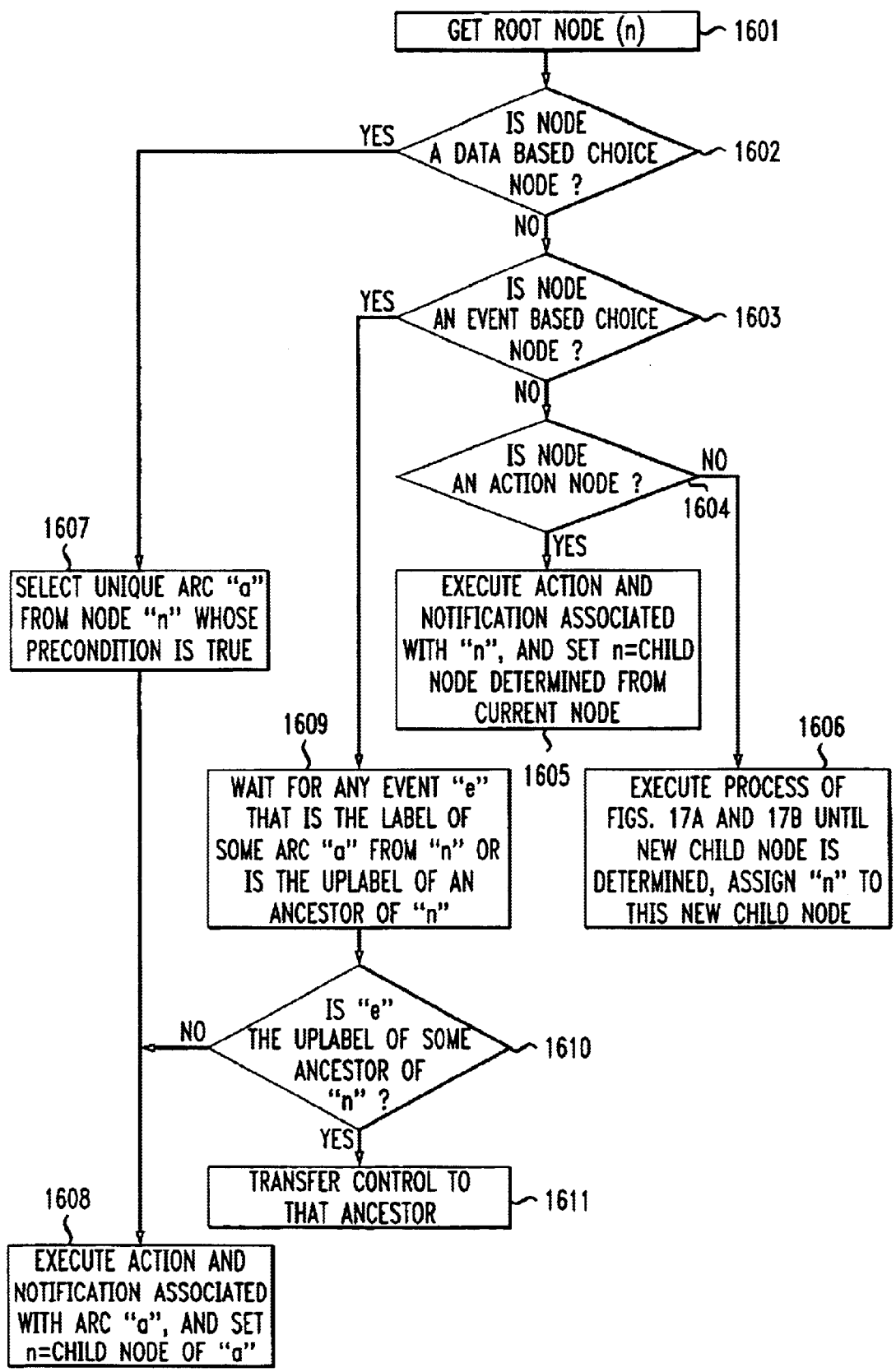
FIG. 16 is a flowchart illustrating the steps in the process of executing reactive constraint graphs.

FIG. 16 is a flowchart illustrating the steps in the process of executing reactive constraint graphs. Specifically, step 1601 obtains a root node (n). Then step 1602 tests to determine if the obtained node is a data based choice node. If the test result in step 1602 is No, step 1603 tests to determine whether the obtained node is an event based choice node. If the tests result in step 1603 is NO, step 1604 tests to determine if the obtained node is an action node. If the test result in step 1604 is YES, step 1605 causes the execution of the action, the execution of the notification associated with node "n" and sets "n=child node", as determined from the current obtained node. If the test result in step 1604 is NO, step 1606 causes the execution of the process of the constraint flowchart of FIG. 15, as described below, until a new child node is determined and, then, assigns "n" to the determined new child node. Returning to step 1602, if the test result is YES, the node is data based, and step 1607 causes a unique arc "a" to be selected from node "n" whose precondition is TRUE. Then step 1608 causes the execution of an action and notification associated with arc "a". Thereafter, step 1608 sets "n=child" node of "a". Returning to step 1603, if the test result is YES, the node is event based, and step 1609 causes a wait for any event "e" that is the label of some arc "a" from node "n" or is the uplabel of some ancestor node of node "n". Then, step 1610 tests to determine if event "e" is the uplabel of some ancestor node of node "n". If the test result in step 1610 is YES, step 1611 causes control to be transferred to the ancestor node. If the test result in step 1610 is NO, control is passed to step 1608, which is then effected as described above. Reactive constraints are discussed further below.

Figure 17A:
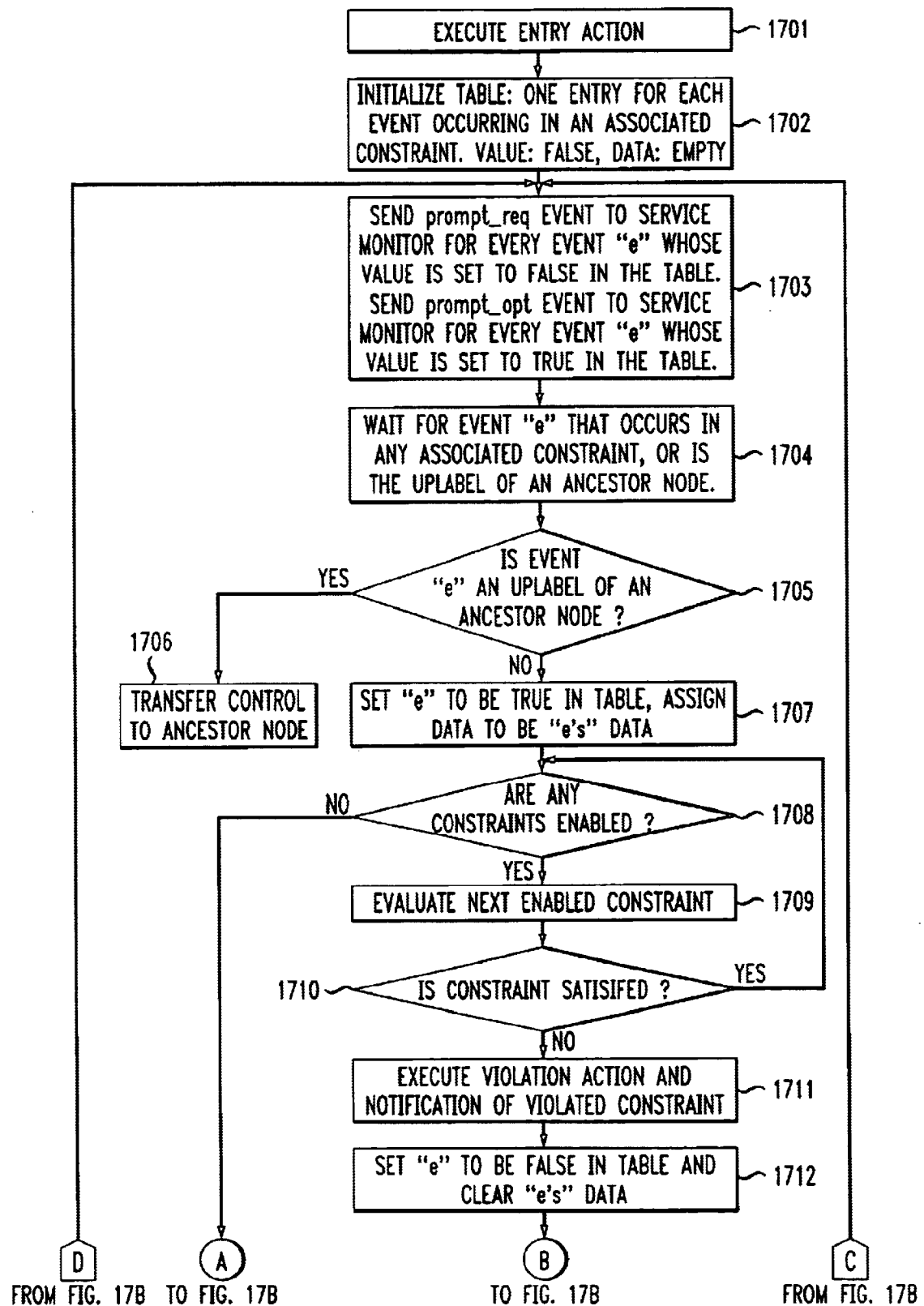
FIG. 17A and FIG. 17B when connected A—A, B—B, C—C, and D—D is a flowchart illustrating the steps in the process of executing constraint nodes.
Figure 17B:
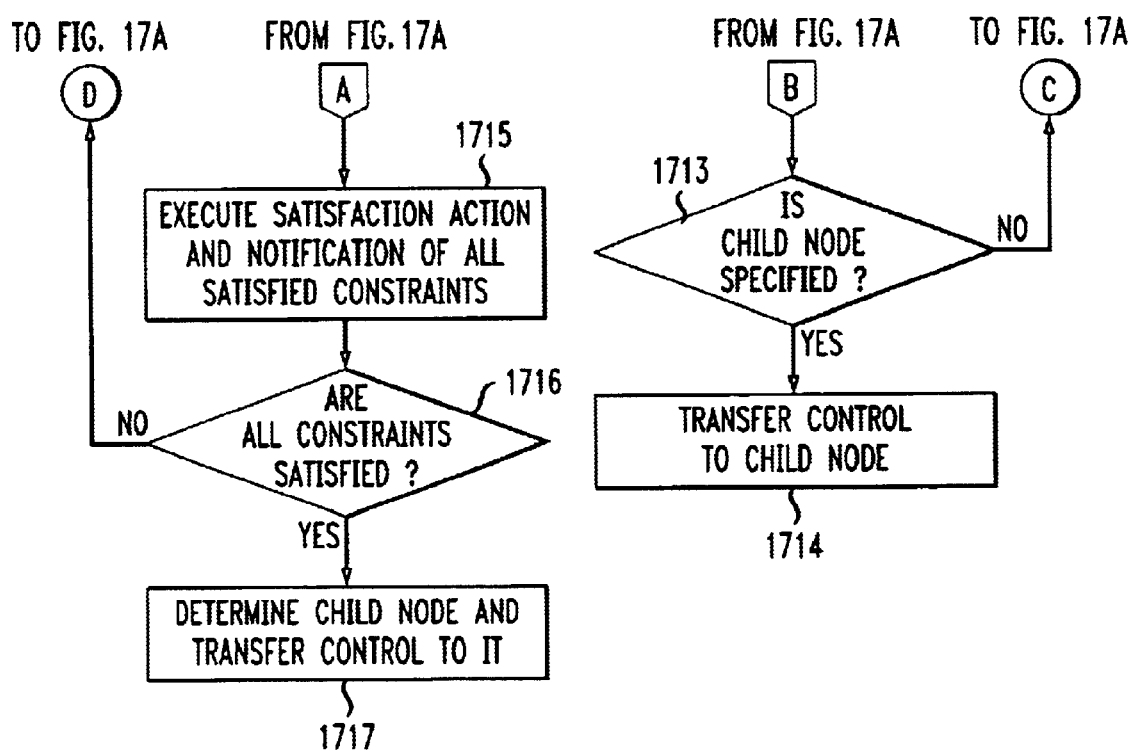

FIG. 17A and FIG. 17B when connected A—A, B—B, C—C, and D—D is a flowchart illustrating the steps in the process of executing constraint nodes. Specifically, step 1701 causes the entry action to be executed. Then, step 1702 causes initialization of a table to be one entry for each event occurring in an associated constraint; value to FALSE; and data to EMPTY. Thereafter, step 1703 causes a prompt_req to be sent to service monitor 1402 for every event "e" whose value is set to FALSE in the table, and a prompt_opt to be sent to service monitor 1402 for every event "e" whose value is set to TRUE in the table. Step 1704 waits for an event "e" that occurs in any associated constraint, or is the uplabel of an ancestor node. Then, step 1705 tests to determine whether event "e" is an uplabel of an ancestor node. If the test result instep 1705 is YES, control is transferred to the ancestor node via step 1706. If the test result in step 1705 is NO, step 1707 causes event "e" to be set TRUE in the table, and assigns data to be "e's" data. Then, step 1708 tests to determine if any constraints are enabled. If the test result in step 1708 is YES, step 1709 causes the next enabled constraint to be evaluated. Then, step 1710 tests to determine whether the evaluated constraint has been satisfied. If the test result in step 1710 is NO, the constraint is not satisfied and step 1711 causes the execution to be effected of the violation action and the notification of violated constraint. Step 1712 causes the setting of event "e" to be False in the table and clears "e's" data. Thereafter, step 1713 tests to determine if a child node is specified. If the test result in step 1713 is YES, step 1714 causes control to be transferred to the specified child node. Returning to step 1708, if the test result is NO, there are no remaining constraints that are enabled and step 1715 causes the execution of the satisfaction action and the notification of all satisfied constraints. Then, step 1716 tests to determine whether all constraints have been satisfied. If the test result in step 1716 is YES, step 1717 causes the child node to be determined and, then, transfers control to it. If the test result in step 1716 is NO, control is returned to step 1703 and appropriate ones of steps 1703 through 1717 are iterated until either step 1706 is reached, or step 1714 is reached, or step 1717 is reached. Returning to step 1710, if a YES result is obtained, control is returned to step 1708 and steps 1708 through 1710 are iterated until either step 1708 yields a NO result or step 1710 yields a NO result. Then, the processes, as described above regarding steps 1708 or 1710 yielding a NO result are repeated. Returning to step 1713, if the test result is NO, the child node is not specified and control is returned to step 1703. Thereafter, appropriate ones of steps 1703 through 1717 are iterated until either step 1706, or step 1714 or step 1717 is reached.

Further details of the SISL architecture are described in U.S. patent application Ser. No. 09/386,094, filed Aug. 30, 1999 and assigned to the assignee of this application.

The above-described embodiment is, of course, merely illustrative of the principles of the invention. Indeed, numerous other methods or apparatus may be devised by those skilled in the art without departing from the spirit and scope of the invention.

What is claimed is:

1. A method for use in a user interface, together with a set of associated databases in which data may be represented as data tables with fields representing different classes of data, comprising the steps of:

receiving a natural language user inquiry;

translating said natural language inquiry to one or more database queries to be made, said step of translating including using knowledge of semantics of fields of one or more prescribed databases of said set of associated databases, knowledge about information visualization technology, and knowledge about a relationship of information visualization to the semantics of the fields of said one or more prescribed databases to determine whether a set of complete database queries can be formulated and, if so, using knowledge of the semantics of the fields of the database, knowledge about information visualization technology, and knowledge about the relationship of information visualization to the semantics of the fields of said one or more prescribed databases to specify one or more database queries to be made;

evaluating results of said translating and knowledge of the semantics of the fields of the database, knowledge about information visualization technology, and knowledge about the relationship of information visualization to the semantics of the fields of said one or more prescribed databases to determine if at least one prescribed database query has resulted;

if so, querying said one or more prescribed databases;

in response to results including retrieved data of said prescribed database query, employing knowledge about the semantics of the retrieved data, knowledge of the semantics of the fields of the database populated by the retrieved data, knowledge about information visualization technology, and knowledge about the relationship of information visualization to the semantics of the fields of said one or more databases to formulate information to be supplied to said user; and supplying said formulated information to be presented to said user, said step of supplying includes in response to the query, employing knowledge of semantics of the retrieved data, knowledge of the semantics of the fields populated by the retrieved data, knowledge about information visualization technology, and knowledge about the relationship of information visualization to the semantics of the fields of said one or more prescribed databases to determine one or more presentation formats and presenting said formulated information to the user in said determined one or more presentation formats using one or more presentation modes.

2. The method as defined in claim 1, if said step of evaluating indicates that at least one prescribed database query has not resulted from said step of translating, further including a step of informing said user that the user inquiry is not supported.

3. The method as defined in claim 2 wherein said step of informing includes a step of using one or more presentation modes to inform the user that said user inquiry is not supported.

4. The method as defined in claim 1 wherein said step of receiving said natural language inquiry includes a step of receiving said user inquiry in one or more input modes.

5. The method as defined in claim 1 wherein if said step of evaluating indicates that no prescribed database query resulted from said step of translating, further including the steps of prompting said user, by employing knowledge of the semantics of the fields of said one or more prescribed databases, knowledge about information visualization technology, and knowledge about the relationship of information visualization to the semantics of the fields of said one or more prescribed databases and context information from a dialogue with the user, to input additional information and/or to correct previously received information, receiving said additional information and/or corrections to previously received information, employing knowledge of the semantics of the fields of said one or more prescribed databases, knowledge about information visualization technology, and knowledge about the relationship of information visualization to the semantics of the fields of said one or more prescribed databases the context information from the dialogue with the user including the received additional information and/or corrections to previously received information to translate said natural language inquiry to one or more database queries to be made, and if the natural language query translates completely into an information visualization command on previously presented data, changing the presentation of the data in accordance with the information visualization command.

6. The method as defined in claim 5 wherein said step of receiving said natural language inquiry includes a step of receiving said user inquiry in one or more input modes and said step of receiving said additional information and/or corrections to previously received information includes a step of receiving said additional information and/or corrections to previously received information in one or more input modes.

7. Apparatus for use in a user interface, together with a set of associated databases in which data may be represented as data tables with fields representing different classes of data, comprising:

a receiver for receiving a natural language user inquiry;

a first translator unit for translating said natural language inquiry to one or more database queries to be made, said first translator includes a first apparatus using knowledge of semantics of fields of one or more prescribed databases of said set of associated databases, knowledge about information visualization technology, and knowledge about a relationship of information visualization to the semantics of the fields of one or more prescribed databases and being adapted to determine whether a set of complete database queries can be formulated and a specifier unit, using knowledge of the semantics of the fields of said one or more prescribed databases, knowledge about information visualization technology, and knowledge about the relationship of information visualization to the semantics of the fields of said one or more prescribed databases, and being responsive to an indication from said first apparatus that a set of complete database inquiries can be formulated, for specifying one or more database queries to be made;

an evaluator unit for evaluating results of said translating and knowledge of the semantics of the fields of said one or more prescribed databases, knowledge about information visualization technology, and knowledge about the relationship of information visualization to the semantics of the fields of said one or more prescribed databases to determine if at least one prescribed database query has resulted;

an interrogator unit for querying said one or more prescribed databases;

a formulator unit, responsive to results including retrieved data of said prescribed database query from said one or more prescribed databases, employing knowledge of the semantics of the retrieved data, knowledge of the semantics of the fields of said one or more prescribed databases populated by the retrieved data, knowledge about information visualization technology, and knowledge about the relationship of information visualization to the semantics of the fields of said one or more prescribed databases for formulating information to be supplied to said user; and a supplier unit to supply said formulated information to be presented to said user, said supplier includes
  a second apparatus, responsive to the query and employing knowledge of semantics of the retrieved data, knowledge of the semantics of the fields of said one or more prescribed databases populated by the retrieved data, knowledge about information visualization technology, and knowledge about the relationship of information visualization to the semantics of the fields of said one or more prescribed databases to determine one or more presentation formats and
  a presenter unit adapted to present said formulated information to the user in said determined one or more presentation formats using one or more presentation modes.

8. The invention as defined in claim 7 wherein said formulator unit is responsive to said evaluator unit yielding an indication that at least one prescribed database query has not resulted for informing said user that the user inquiry is not supported.

9. The invention as defined in claim 8 wherein said formulator unit uses a prescribed mode of or a combination of prescribed modes of a plurality of prescribed modes to inform said user that said user inquiry is not supported.

10. The invention as defined in claim 7 wherein said receiver includes reception apparatus for receiving said natural language user inquiry in one or more input modes.

11. The invention as defined in claim 7 wherein said evaluator unit includes an indicator unit for indicating whether a specified database query has resulted, and further including a prompter unit responsive to an indication from said indicator unit that no prescribed database query has been specified, for prompting said user by employing knowledge of the semantics of the fields of said one or more prescribed databases, knowledge about information visualization technology, and knowledge about the relationship of information visualization to the semantics of the fields of said one or more prescribed databases and context information from a dialogue with the user, to input additional information and/or to correct previously received information, said receiver including reception apparatus for receiving said additional information and/or corrections to previously received information, and a second translator unit employing knowledge of the semantics of the fields of said one or more prescribed databases, knowledge about information visualization technology, knowledge about the relationship of information visualization to the semantics of the fields of said one or more prescribed databases and the context information from the dialogue with the user including said received additional information and/or corrections to previously received information for translating said natural language inquiry to one or more database queries to be made, and wherein said evaluator unit evaluates results of said second translating by said second translator unit to determine if at least one prescribed database query has resulted, and if the natural language query translates completely into an information visualization command on previously presented data, changing the presentation of the data in accordance with the information visualization command.

12. The invention as defined in claim 11 wherein said receiver includes reception apparatus for receiving said natural language user inquiry in one or more input modes and for receiving said additional information and/or corrections to previously received information in one or more input modes.

13. Apparatus for use in a user interface, together with a set of associated databases in which data may be represented as data tables with fields representing different classes of data, comprising:
  means for receiving a natural language user inquiry;
  first means for translating said natural language inquiry to one or more database queries to be made, said first means for translating includes
    means, supplied with and using knowledge of semantics of fields of one or more prescribed databases of said set of associated databases, knowledge about information visualization technology, and knowledge about a relationship of information visualization to the semantics of the fields of said one or more prescribed databases, and being adapted for determining whether a set of complete database queries can be formulated and
    means, supplied with and using knowledge of the semantics of the fields of said one or more prescribed databases, knowledge about information visualization technology and knowledge about the relationship of information visualization to the semantics of the fields of said one or more prescribed databases, and being responsive to an indication that said set can be formulated, for specifying one or more database queries to be made;
  means for evaluating results of said translating and knowledge of the semantics of the fields of said one or more prescribed databases, knowledge about information visualization technology, and knowledge about the relationship of information visualization to the semantics of the fields of said one or more prescribed databases to determine if at least one prescribed database query has resulted;
  means for querying said one or more prescribed databases;
  means, responsive to results including retrieved data from said one or more prescribed databases of said prescribed database query, and employing knowledge of semantics of the retrieved data knowledge of the semantics of the fields of said one or more prescribed databases populated by the retrieved data, knowledge about information visualization technology, and knowledge about the relationship of information visualization to the semantics of the fields of said one or more prescribed databases, for formulating information to be supplied to said user; and
  means for supplying said formulated information to be presented to said user, said means for supplying includes
    means, responsive to the query, and employing knowledge of the semantics of the retrieved data, knowledge of the semantics of the fields populated in said one or more prescribed databases by the retrieved data, knowledge about information visualization technology, and knowledge about the relationship of information visualization to the semantics of the fields of said one or more prescribed databases, for determining one or more presentation formats and
    means for presenting said formulated information to the user in said determined one or more presentation formats using one or more presentation modes.

14. The invention as defined in claim 13 further including means, responsive to an indication from said means for evaluating that at least one prescribed database query has not resulted, for informing said user that the user inquiry is not supported.

15. The invention as defined in claim 14 wherein said means for informing includes means for using one or more presentation modes to inform said user that said user inquiry is not supported.

16. The invention as defined in claim 13 wherein said means for evaluating includes means for indicating whether a specified database query has resulted, and further including means, responsive to an indication from said means for indicating that no prescribed database query has been specified, for prompting said user by employing knowledge of the semantics of the fields of said one or more prescribed databases, knowledge about information visualization technology, knowledge about the relationship of information visualization to the semantics of the fields of said one or more prescribed databases and the context information from the dialogue with the user, to input additional information and/or to correct previously received information, said means for receiving, receiving said additional information and/or corrections to previously received information, and second means, employing knowledge of the semantics of the fields of said one or more prescribed databases, knowledge about information visualization technology, knowledge about the relationship of information visualization to the semantics of the fields of said one or more prescribed databases and the context information from the dialogue with the user including said received additional information and/or corrections to previously received information, for translating said natural language inquiry to one or more database queries to be made and wherein said means for evaluating evaluates results of said second translating by said second means for translating to determine if at least one prescribed database query has resulted, and if the natural language query translates completely into an information visualization command on previously presented data, changing the presentation of the data in accordance with the information visualization command.

* * * * *